US012586122B1

(12) United States Patent
Zhou et al.

(10) Patent No.: US 12,586,122 B1
(45) Date of Patent: *Mar. 24, 2026

(54) EMBEDDED ONE-CLICK CHECKOUT

(71) Applicant: Bolt Financial, Inc., San Francisco, CA (US)

(72) Inventors: Yangxue Zhou, San Francisco, CA (US); Gregory Richard Greiner, San Francisco, CA (US)

(73) Assignee: Bolt Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/255,783

(22) Filed: Jun. 30, 2025

Related U.S. Application Data

(60) Continuation of application No. 18/615,612, filed on Mar. 25, 2024, which is a division of application No. 17/240,883, filed on Apr. 26, 2021, now Pat. No. 11,941,684.

(51) Int. Cl.
| | |
|---|---|
| *G06Q 10/083* | (2024.01) |
| *G06F 9/451* | (2018.01) |
| *G06Q 30/0601* | (2023.01) |
| *H04L 67/306* | (2022.01) |

(52) U.S. Cl.
CPC ....... *G06Q 30/06333* (2025.08); *G06F 9/451* (2018.02); *G06Q 10/083* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 7,028,288 B2* | 4/2006 | Wall | G06F 40/174 |
| | | | 717/109 |
| 8,117,644 B2* | 2/2012 | Chaganti | G06F 21/62 |
| | | | 726/4 |
| 8,594,859 B2* | 11/2013 | Contreras Delpiano | |
| | | | G06Q 30/0251 |
| | | | 701/2 |
| 9,942,214 B1* | 4/2018 | Burciu | H04L 63/08 |
| 11,477,203 B2* | 10/2022 | Panag | H04L 63/083 |
| 11,941,684 B2* | 3/2024 | Zhou | H04L 67/306 |
| 12,205,158 B2* | 1/2025 | Yeh | G06Q 20/12 |

(Continued)

*Primary Examiner* — Nicholas D Rosen
(74) *Attorney, Agent, or Firm* — Baker Botts L.L.P.

(57) ABSTRACT

In one embodiment, a method by a processing system includes receiving information associated with a first processing request for a first interaction, sending instructions for generating customized embedded fields within a graphical user interface displayed on a computing device associated with the user, where the customized embedded fields are configured to receive as input data associated with a digital instrument, and where a subset of the customized embedded fields is configured to analyze the data associated with the digital instrument to determine whether the data associated with the digital instrument is accurate and valid, receiving the data associated with the digital instrument, receiving a confirmation for the first interaction and an indication that the user has provided authorization to create a user profile with the processing system, facilitating an authorization for the first interaction, and creating the user profile in a database.

20 Claims, 17 Drawing Sheets

(56) References Cited

U.S. PATENT DOCUMENTS

| | | | | |
|---|---|---|---|---|
| 12,217,244 B2 * | 2/2025 | DePopas | .............. | G06Q 20/367 |
| 12,288,247 B2 * | 4/2025 | Zhou | .................. | G06Q 30/0637 |
| 12,299,381 B1 * | 5/2025 | Pezeshki | .............. | G06F 40/151 |
| 12,346,956 B1 * | 7/2025 | Zhou | ...................... | G06Q 20/42 |
| 2003/0226115 A1 * | 12/2003 | Wall | ...................... | G06F 40/174 |
| | | | | 715/210 |
| 2011/0004943 A1 * | 1/2011 | Chaganti | .............. | H04L 63/105 |
| | | | | 726/30 |
| 2012/0095830 A1 * | 4/2012 | Contreras Delpiano | .................... | |
| | | | | B60L 53/63 |
| | | | | 700/297 |
| 2014/0089134 A1 * | 3/2014 | Linh | ................... | G06Q 20/384 |
| | | | | 705/26.7 |
| 2016/0005084 A1 * | 1/2016 | Ryan | ................. | G06Q 30/0277 |
| | | | | 705/14.54 |
| 2021/0383366 A1 * | 12/2021 | DePopas et al. | ........................... | |
| | | | | G06Q 20/38215 |
| 2022/0021681 A1 * | 1/2022 | Panag | ................... | H04L 63/102 |
| 2023/0033490 A1 * | 2/2023 | Yeh | ...................... | G06Q 20/385 |

* cited by examiner

100

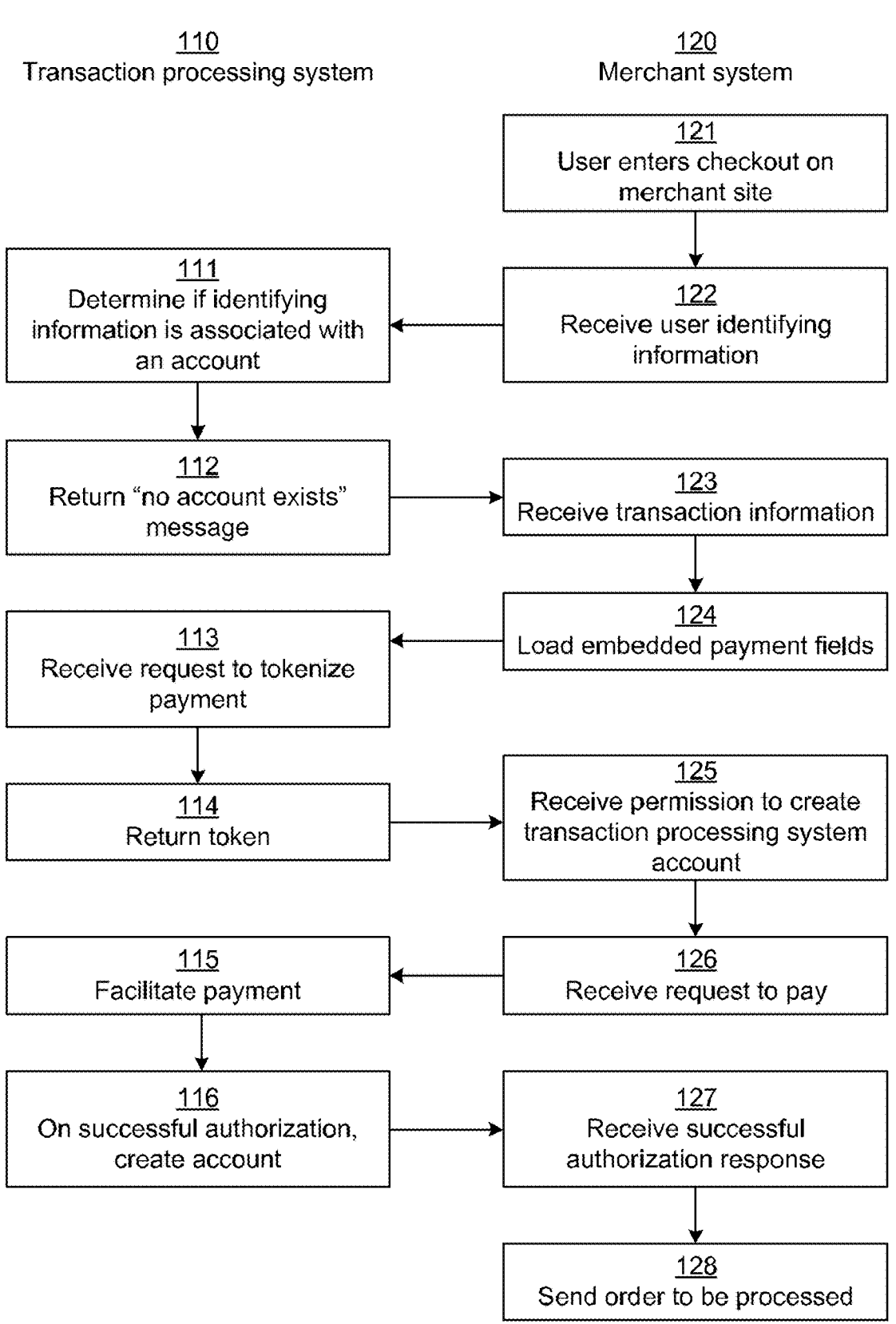

110
Transaction processing system

120
Merchant system

121
User enters checkout on merchant site

111
Determine if identifying information is associated with an account

122
Receive user identifying information

112
Return "no account exists" message

123
Receive transaction information

113
Receive request to tokenize payment

124
Load embedded payment fields

114
Return token

125
Receive permission to create transaction processing system account

115
Facilitate payment

126
Receive request to pay

116
On successful authorization, create account

127
Receive successful authorization response

128
Send order to be processed

EMBEDDED ONE-CLICK CHECKOUT

PRIORITY

This application is a continuation under 35 U.S.C. § 120 of U.S. patent application Ser. No. 18/615,612, filed 25 Mar. 2024, which is a divisional under 35 U.S.C. § 121 of U.S. patent application Ser. No. 17/240,883, filed 26 Apr. 2021, each of which is incorporated herein by reference.

TECHNICAL FIELD

This disclosure generally relates to interfaces for completing a transaction.

BACKGROUND

Many online purchases are made by customers through independent merchants. In most cases, merchants allow customers to either register for an account with the merchant or to proceed with a purchase as a "guest." Customers who register for accounts with a merchant often receive benefits, such as expedited re-ordering or subsequent ordering because the merchant can store necessary purchase information or easy access to an order history. Customers who make purchases as a guest must re-enter information such as shipping and payment information for each order. However, customers may prefer not to make additional accounts as they do not wish to be responsible for remembering an additional account name and password for each merchant from which they make purchases. This added burden discourages customers from taking advantage of the benefits offered by merchant-specific accounts and increases the friction and computing resources typically necessary to complete each subsequent customer order.

Customer discomfort or disinterest with creating merchant-specific accounts also creates inefficiencies for merchants. Merchants may struggle to identify customers across purchases, decreasing the ability for merchants to accurately recommend products related to previous purchases. Merchants also risk losing or reducing sales to customers by customers deciding against making purchases after being asked to re-enter information. Merchants must also allocate additional computational resources to provide for user interfaces and other user experience features to accommodate return customers to re-enter information necessary for a purchase.

SUMMARY OF PARTICULAR EMBODIMENTS

Embodiments described herein in include systems and methods for automatically converting a guest checkout for an order or transaction at a merchant into a one-click checkout by identifying payment information associated with user identifying information entered into a guest checkout interface. In particular embodiments, a computing system associated with a transaction processing system receives, from a computing system associated with a merchant, user identifying information in association with a checkout request for an order corresponding to a proposed transaction. The transaction processing system determines that a user account with the transaction processing system associated with the user identifying information does not exist in a database associated with the transaction processing system. Subsequent to determining that the user account associated with the user identifying information does not exist, the transaction processing system receives, from the computing system associated with the merchant, payment information for the order from the user. The transaction processing system concurrently receives, from the computing system associated with the merchant, an order confirmation and authorization to create a new account with the transaction processing system corresponding to the user identifying information. The transaction processing system, facilitates authorization for the order. The transaction processing system stores order information corresponding to the order and the received payment information in association with the user identifying information in the database associated with the transaction processing system. In particular embodiments, prior to receiving the payment information for the order from the user, the transaction processing system sends, to the computing system associated with the merchant, a notification that the user account associated with the transaction processing system associated with the user identifying information does not exist. Responsive to receiving the notification, the computing system associated with the merchant causes a user interface for collecting payment information to be displayed on a user computing device. In particular embodiments, the transaction processing system sends a notification of successful order authorization to the computing system associated with the merchant.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 1 illustrates example interactions between systems for creating an account to be used with an embedded one-click checkout for subsequent purchases.

DESCRIPTION OF EXAMPLE EMBODIMENTS

Figure 2A:
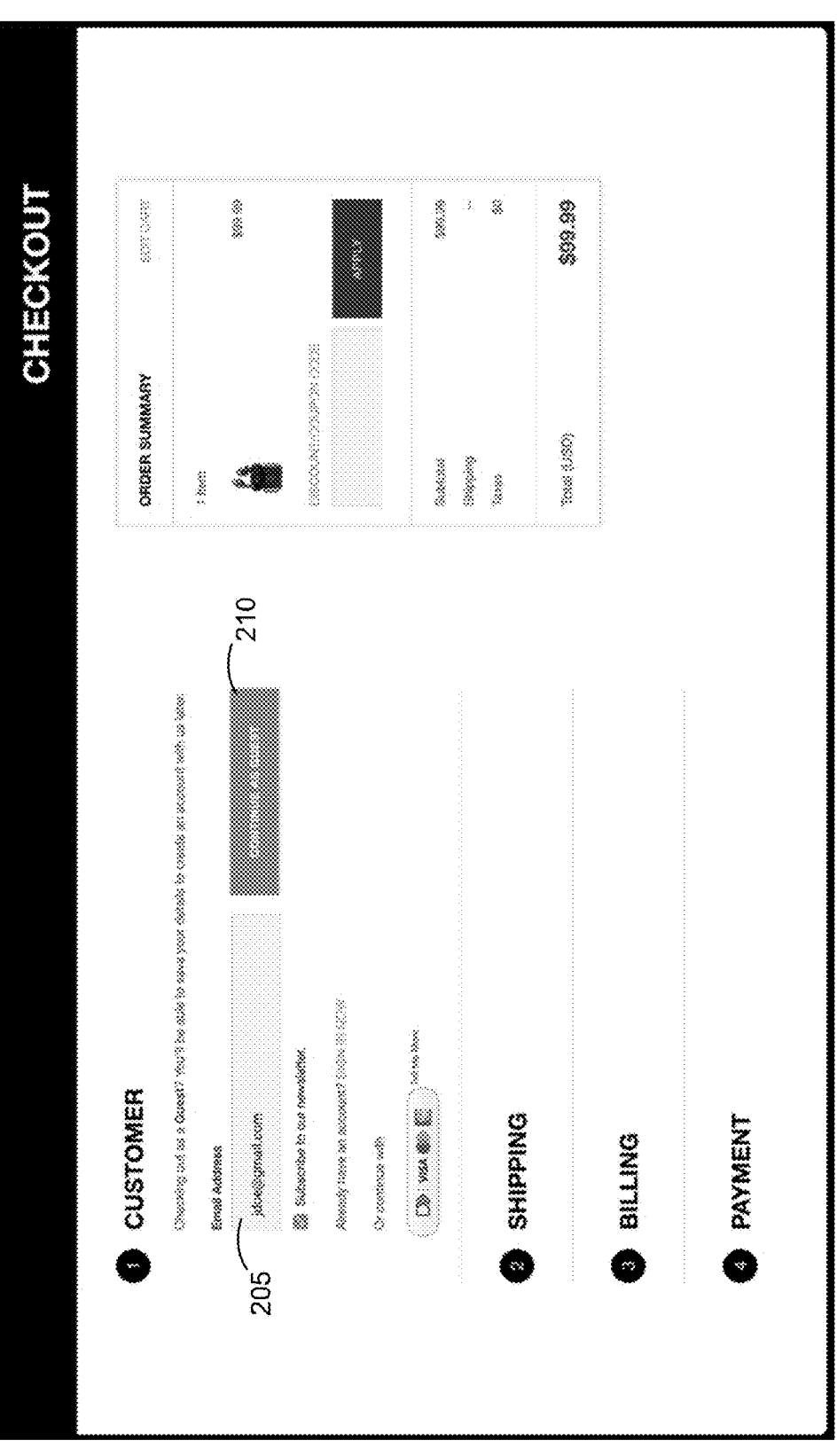
FIGS. 2A-2D illustrates example user interfaces for creating an account to be used with an embedded one-click checkout for subsequent purchases.

Particular embodiments disclosed herein may be designed to address specific problems or omissions in the current state of the art as described herein. As described herein, particular embodiments include systems and methods for automatically converting a guest checkout for a purchase order at a merchant into a one-click checkout by identifying payment information associated with user identifying information entered into a guest checkout interface. In particular embodiments, a computing system associated with a transaction processing system receives, from a computing system associated with a merchant, user identifying information in association with a checkout request for an order. The transaction processing system determines that a user account with the transaction processing system associated with the user identifying information does not exist in a database associated with the transaction processing system. Subsequent to determining that the user account associated with the user identifying information does not exist, the transaction processing system receives, from the computing system associated with the merchant, payment information for the order from the user. The transaction processing system concurrently receives, from the computing system associated with the merchant, an order confirmation and authorization to create a new account with the transaction processing system corresponding to the user identifying information. The transaction processing system, facilitates authorization for the order. The transaction processing system stores order information corresponding to the order and the received payment information in association with the user identifying information in the database associated with the transaction processing system. In particular embodiments, prior to receiving the payment information for the order from the user, the transaction processing system sends, to the computing system associated with the merchant, a notification that the user account associated with the transaction processing system associated with the user identifying information does not exist. Responsive to receiving the notification, the computing system associated with the merchant causes a user interface for collecting payment information to be displayed on a user computing device. In particular embodiments, the transaction processing system sends a notification of successful order authorization to the computing system associated with the merchant.

In particular embodiments, subsequent to storing the order information corresponding to the order and the received payment information in association with the user identifying information, the computing system associated with a transaction processing system receives the user identifying information in association with a second checkout request. The transaction processing system determines that the user account associated with the user identifying information exists based on determining that the user identifying information received in association with the second checkout request corresponds to the stored user identifying information. The transaction processing system processes the second checkout request using the order information and the stored payment information. In particular embodiments, prior to processing the second checkout request using the order information and the stored payment information, the transaction processing system causes an account authorization user interface to be displayed on a user computing device corresponding to the stored user identifying information, sends a one-time password to the user computing device via a communication channel associated with the stored user identifying information, receives the one-time password from the user computing device via the account authorization user interface, and determines that the one-time password sent to the user computing device corresponds with the one-time password received from the user computing device via the account authorization user interface. In particular embodiments, while processing the second checkout request using the order information and the stored payment information, the transaction processing system retrieves the order information and stored payment information from the database associated with the transaction processing system using the user identifying information received in association with the second checkout request, causes preferred payment options to be presented in a checkout interface on a user computing device corresponding to the stored user identifying information, and receives a confirmation of the order from the user computing device via the checkout interface. In particular embodiments, the transaction processing system causes preferred address information based on the order information to be presented in the checkout interface on the user computing device. In particular embodiments, the user identifying information received in association with the checkout request is an email address or a phone number. In particular embodiments, the user identifying information stored in the database associated with the transaction processing system includes the email address and the phone number. In particular embodiments, the user identifying information received from the computing system associated with the merchant is originated from a guest checkout interface presented on a user computing device.

In further embodiments, a user computing device presents a guest checkout interface in an application executing on the user computing device. The guest checkout interface is presented in association with a purchase order. The purchase order corresponding to a proposed transaction. The user computing device receives, through the guest checkout interface, user identifying information in association with the order. The user computing device sends the user identifying information to a computing system associated with a transaction processing system. The user computing device receives, from the transaction processing system, a notification that the user identifying information is not associated with a user account associated with the transaction processing system. The user computing device receives, through the guest checkout interface, payment information and order information for the order. The user computing device sends, to the transaction processing system, the received payment information and order information. The user computing device presents an order confirmation and user account creation interface.

In particular embodiments, the user computing device receives, through the guest checkout interface, a user input corresponding to authorization to create the user account using the received user identifying information, payment information, and order information. In particular embodiments, the user identifying information received in association with the order is an email address and the order information for the order includes a phone number and shipping address. In particular embodiments, the user computing device presents, a second guest checkout interface in the application executing on the user computing device. The second guest checkout interface is presented in association with a second order. The user computing device receives, through the second guest checkout interface, the user identifying information in association with the second order. The user computing device sends the user identifying information to the transaction processing system. The user computing device receives, from the transaction processing system, payment information and order information stored by the transaction processing system in association with the user identifying information. The user computing device presents an order confirmation interface including the payment information and order information received from the transaction processing system. In particular embodiments, the first order is associated with a first merchant and the second order is associated with a second merchant. In particular embodiments, subsequent to receiving the user identifying information in association with the second order, the user computing device presents an account authorization interface. The user computing device receives input corresponding to a one-time password from the account authorization interface. The user computing device sends the input corresponding to the one-time password to the transaction processing system. In particular embodiments, the user computing device receives the payment information and order information stored by the transaction processing system in association with the user identifying information after the transaction processing system verifies the one-time password.

As described herein, although many online purchases are made by customers through a "guest checkout" interface at independent merchants, most customers do not sign up for merchant-specific accounts. Customers who do not use merchant-specific accounts cannot take advantage of the added features of the merchant-specific accounts, such as expedited repeat ordering or re-ordering, reduced time lost due to re-entering payment and shipping information, and other benefits offered by merchant systems. Possible reasons for customer disinterest in or disregard of merchant-specific accounts include the fact that sign-up and login processes are often cumbersome, and consuming significant user time and computing resources, managing multiple logins is challenging and doing so makes it more likely that repeat passwords will be relied on, and there's ultimately low customer trust that merchants will save data securely. This disinterest in merchant-specific accounts also negatively impacts merchants' ability to monitor sales performance between new and repeat customers, decreases the ability for merchants to recommend related products to customers who may be interested in them, and ultimately expose merchants to the risk of losing customers due to the added labor of providing payment information and order information such as a shipping addresses, shipping preferences, and contact information.

A transaction processing system, as the term is used in this disclosure, refers to a entity that works with customers and merchants (and potentially other entities such as acquiring and issuing institutions) to expedite order processing and ensuring that merchants are paid. A transaction processing system can, for example, collect payment information from customers on behalf of merchants, analyze the information for completeness and security risks (e.g., fraud), and submit the information for processing upon receiving a customer's checkout request. The transaction processing system often receives information, such as contact information for a user, uniquely identifying information for the user, and related, that is passed on to merchants. The transaction processing system, therefore, is uniquely positioned to receive information from a wide variety of customers across a similarly wide variety of merchants.

Embodiments described herein are related to a transaction processing system that, through the use of specially-configured hardware and architecture, as well as through the user of specially-configured programming interfaces, provides a technologically-oriented solution to the problems described above which arise uniquely in the technical field of ecommerce. In particular, the embodiments described herein relate to systems and methods for creating a universal logged-in, one-click checkout experience as the default experience for customers on any merchant website. More specifically, customers who are repeat visitors to merchant websites that subscribe to the transaction processing system, or otherwise authorize access by the transaction processing system, can quickly create accounts with the transaction processing system directly—forgoing the need to create a separate merchant account for each merchant from whom they make purchases.

To solve the myriad problems associated with the current state of guest checkouts, a transaction processing system can use saved account information from a customer to offer a one-click checkout. Customers sign up for their account with the transaction processing system once and can access their saved information on any website that uses the transaction processing system. The embedded one-click checkout, so-called because it can occur with little overhead from the customer or merchant, has magnifying network effects. As more shoppers sign-up for transaction processing system accounts, more merchants benefit from the decreased checkout friction and see a higher percentage of their checkouts turn into one-click checkouts. As more merchants use the embedded one-click checkout system, shoppers gain the benefit of increased easy access to merchants. Furthermore, both customers and merchants benefit because, rather than having sensitive information dispersed across unknown numbers of merchants, only a single transaction processing system account holds payment information for the user. This allows the transaction processing system to harden their security and protect against malicious actors.

One-click checkout solutions can be divided into two types: managed and embedded. In a managed system, the transaction processing system takes over for the entirety of the merchant's checkout experience. While some merchant may prefer a turnkey solution, for merchants who have spent time and resources on customizing the final steps of the user engagement experience, handing over the experience to a third party may not be ideal. Furthermore, merchants may have greater faith in systems they can control, for example ensuring the security of saved customer data that has been entrusted to them.

In the "embedded" one-click checkout system, as in that described herein, only the guest checkout procedures are updated. The embedded solution described herein enables registration for transaction processing system accounts through hosted fields in the checkout user interface and surfacing a transaction processing system modal when the user checking out is a recognized transaction processing system user. A user will be recognized when the information provided to one of the hosted fields can be used to definitively determine that the customer has an existing account with the transaction processing system. If a user is not recognized, then the merchant's own guest checkout is used. This allows merchants access to the cross-merchant accounts network without replacing the default guest checkout. Additionally, merchant and merchant-preferred providers, can outsource modular aspects of the checkout experience to a transaction processing system that specializes in converting customers performing true guest checkouts into customers associated with a transaction processing system account. Upon realizing these benefits, merchants can easily tie into even greater benefits offered by a transaction processing system, including customer loyalty experiences, fraud solutions, payment processing, multi-payment method orchestration, and the full "managed" one-click checkout solution.

To enable the embedded one-click checkout system, merchants and other ecommerce providers can modify their checkout systems to ensure that the guest checkout system naturally acquires the information used by the transaction processing system to operate the one-click checkout system. This can include ensuring that multiple levels of user identification and communication are collection. For example, an email address can act as a first level of identification and a primary means of communication, e.g., order status and transaction history.

A phone number can also be collected to act as a second factor when identification customers and logging them in to access stored payment and shipping information. The phone number can be used as a separate communication channel during a one-time password (e.g., passwordless) login. For example, if a user seeks to login into their transaction processing system account, rather than enter a secret password, the transaction processing system can cause a one-time use password to be sent to a user device belonging to a customer. The user enters this one-time use password into an authentication challenge interface presented when a user seeks to login.

Additionally, the checkout systems can be modified to provide a user the opportunity to authorize the creation of a transaction processing system account that is separate from a merchant account. Because the transaction processing system will be storing sensitive information, consent of the customer ensures they are both aware of the features provided to them by the transaction processing system account and also accepting of the risks of allowing certain information to be stored. Because the embedded one-click checkout is a new feature for merchant checkout systems, at least some modification to comply with this requirement is expected.

Particular embodiments disclosed herein may provide one or more of the results, effects, or benefits described herein. Particular embodiments disclosed herein may be implemented using one or more example architectures described herein.

Embodiments will now be described with references to the enclosed figures. FIG. 1 illustrates a diagram of example interactions between a transaction processing system (e.g., a computing system or computing server associated with a transaction processing system) and a merchant (e.g., a computing system associated with the merchant) or a merchant vendor. In particular, FIG. 1 illustrates a method 100 for creating a transaction processing system account through an embedded one-click checkout through the interactions of a transaction processing system 110 and a merchant system 120.

The method begins at step 121, where a user enters a checkout interface on the merchant site. This may be the first time the user has entered the checkout interface, or the user may be a repeat customer, but the merchant system 120 is unaware because they cannot track the user's actions within the merchant site.

At step 122, the user enters identifying information, such as an email address or phone number, into the guest checkout interface presented at the merchant site. The user may select an interactive interface element to continue the checkout process. The merchant system 120 receives the identifying information and sends a request to the transaction processing system 110. The request may take the form of an call on an application programming interface made available by the transaction processing system 110.

At step 111, the transaction processing system determines if the entered identifying information is associated with an existing transaction processing system account. To determine if an account exists or not, the transaction processing system 110 may query one or more databases maintained by the transaction processing system 110 for the purpose of storing transaction processing system accounts. The transaction processing system 110 can query the database using the provided user identifying information.

At step 112, the transaction processing system 110 has determined that no account exists and returns a "no accounts exists" message to the merchant system 120. The merchant system 120 is now at a where the user would ordinarily enter order information (e.g., shipping information and preferences) and payment information to complete the transaction. At 123, the merchant system receives said order information from the user. The user can be interacting with the merchant system through a user device of the merchant. For example, the user device can be executing an application associated with the merchant system or can be executing a web browser visiting a website of the merchant. At step 124, the merchant system 120 retrieves and display customized embedded fields provided by the transaction processing system platform. The embedded fields can include, for example, fields for ensuring that payment information that has been collected from a user is accurate and valid. The embedded fields can also add layers of security to protect sensitive payment information. The user enters additional request information into the embedded fields presented on behalf of the transaction processing system 110. The merchant system 120 sends the information collected in the fields to the transaction processing system 110. For example, the merchant system can use an application programming interface provided by the transaction processing system for posting payment information.

At step 113, the transaction processing system 110 receives the payment information and a request to tokenize the payment order from the merchant system 120. In particular embodiments, the merchant system 120 can affirmatively request tokenization or the transaction processing system 110 simply interpret requests of the nature received from the merchant system 120 as tokenization request. The transaction processing system 110 tokenizes payment information and, at step 114, returns the payment token to the merchant system 120. At step 125, the merchant system 120 receives another user input, this time in the form of the user assenting to the creation of a transaction processing system account on their behalf. This may take the form of a checkbox in the merchant's checkout flow. At step 126, the merchant system receives a user input indicating that the user would like to proceed with the order. This may take the form of the user interacting with an interactive element in the user interface, such as a button marked "Pay". At step 115, the transaction processing system 110 proceeds to facilitate payment to the merchant from the customer by securing authorization for the order. In particular embodiments, the transaction processing system 110 can process the payment itself. In particular embodiments, the transaction processing system 110 can use trusted partners to handle payment on its behalf. In particular embodiments, the transaction processing system 110 can use a payment processor specified by the merchant. For example, the merchant system 120 may already have process integrations with a specified payment processor. The transaction processing system can use those existing integrations to streamline payment.

At step 116, the transaction processing system 110 receives an indication that the payment was successfully authorized. This can take the form of a message from the payment processor used during step 115. On receiving the notice of successful authorization, the transaction processing system creates an transaction processing system account for the customer using the receive information. As an example, the transaction processing system 110 can create a new entry in a database for storing transaction processing system account information. The new entry can be indexed by the user identifying information received for the customer. The new entry can store information such as the payment information received from the merchant system 120 and the transaction information (e.g., shipping address, instructions, or preferences).

At 127, the transaction processing system 110 sends a notice of the successful authorization to the merchant system 120. Upon receiving the notice of successful authorization, the merchant system 120 can update its internal records and, at step 127, send the order to be processed, such as by securing inventory for the customer and causing it to be delivered.

Figure 2B:
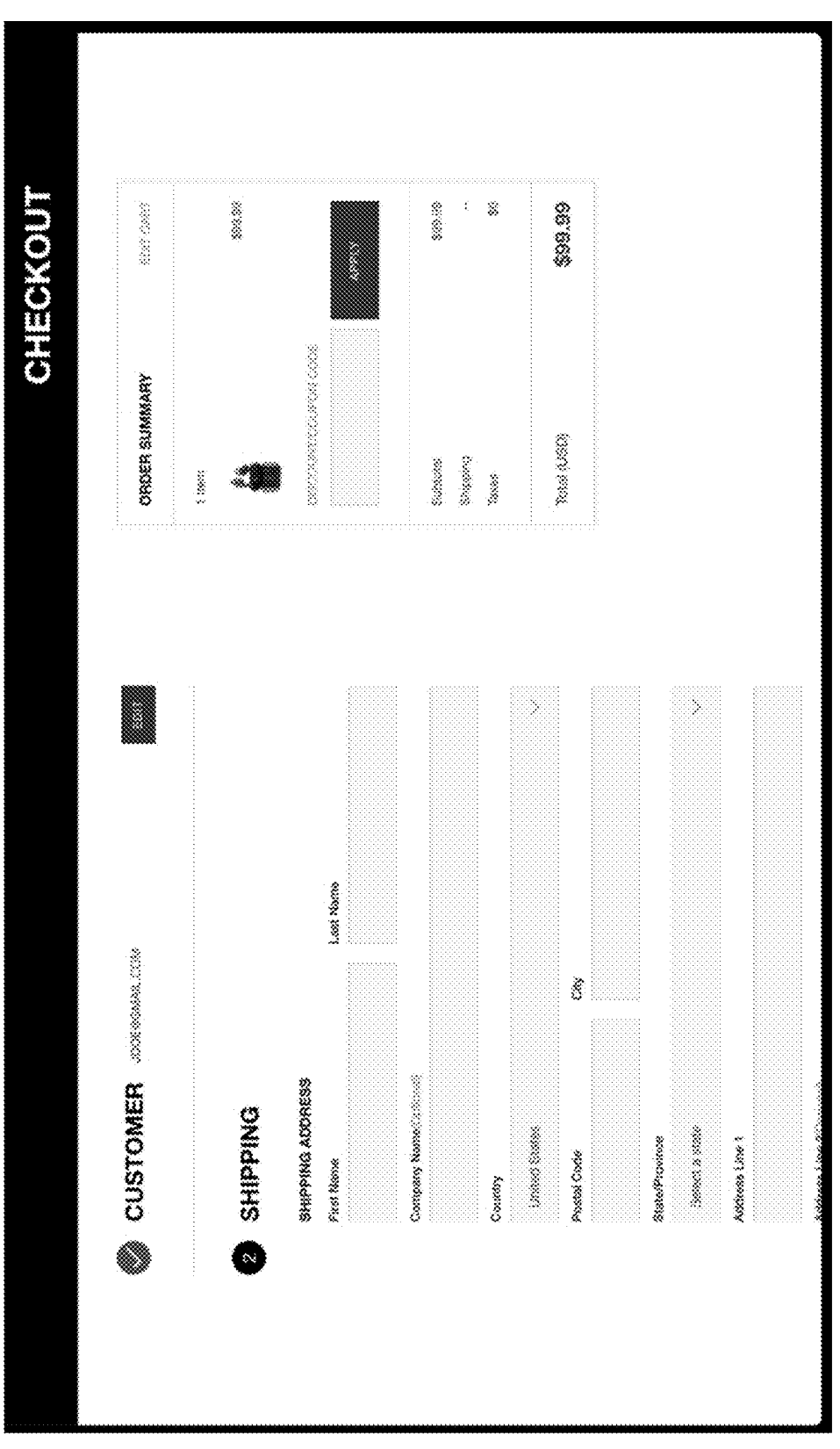
Figure 2C:
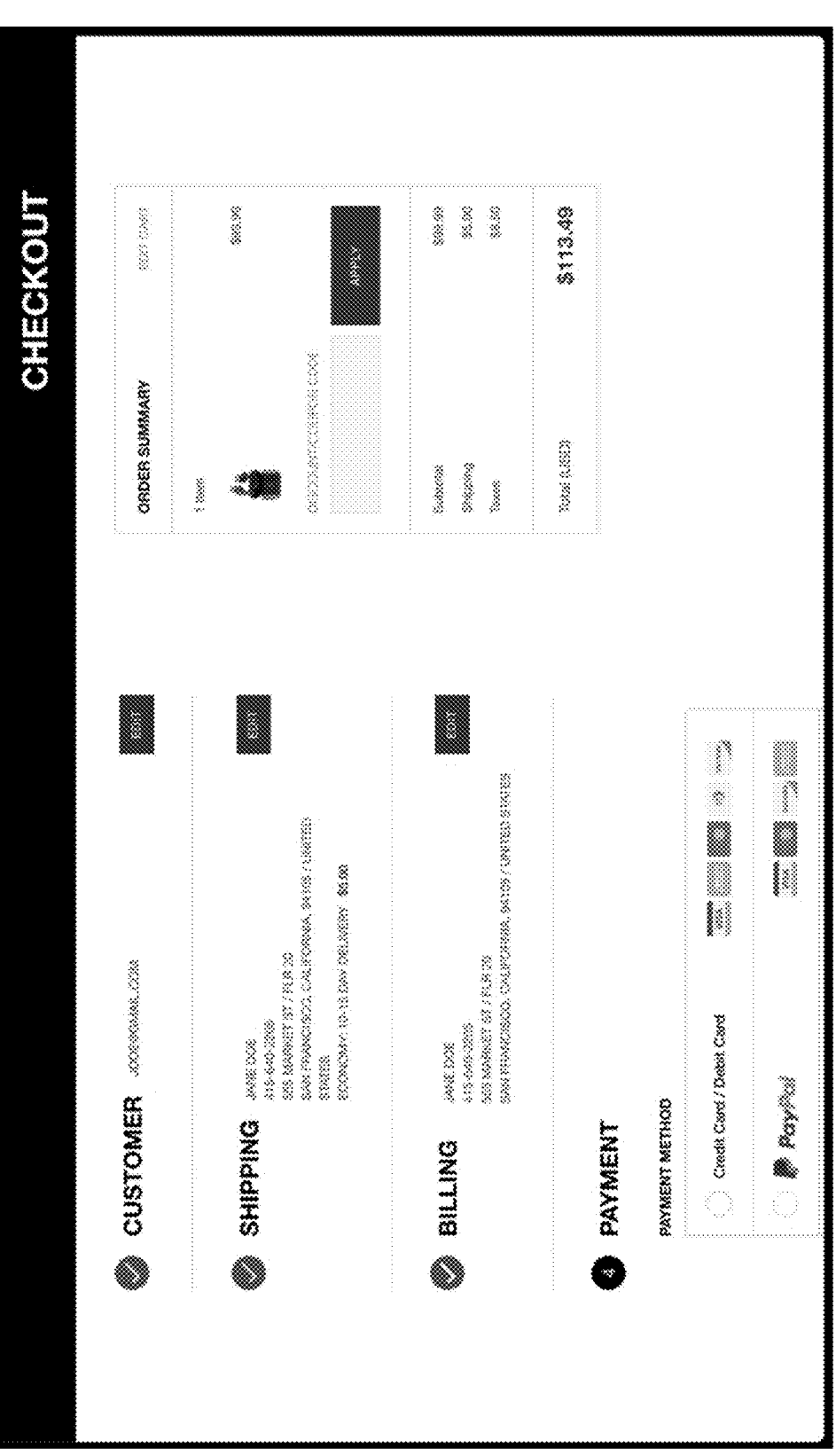
Figure 2D:
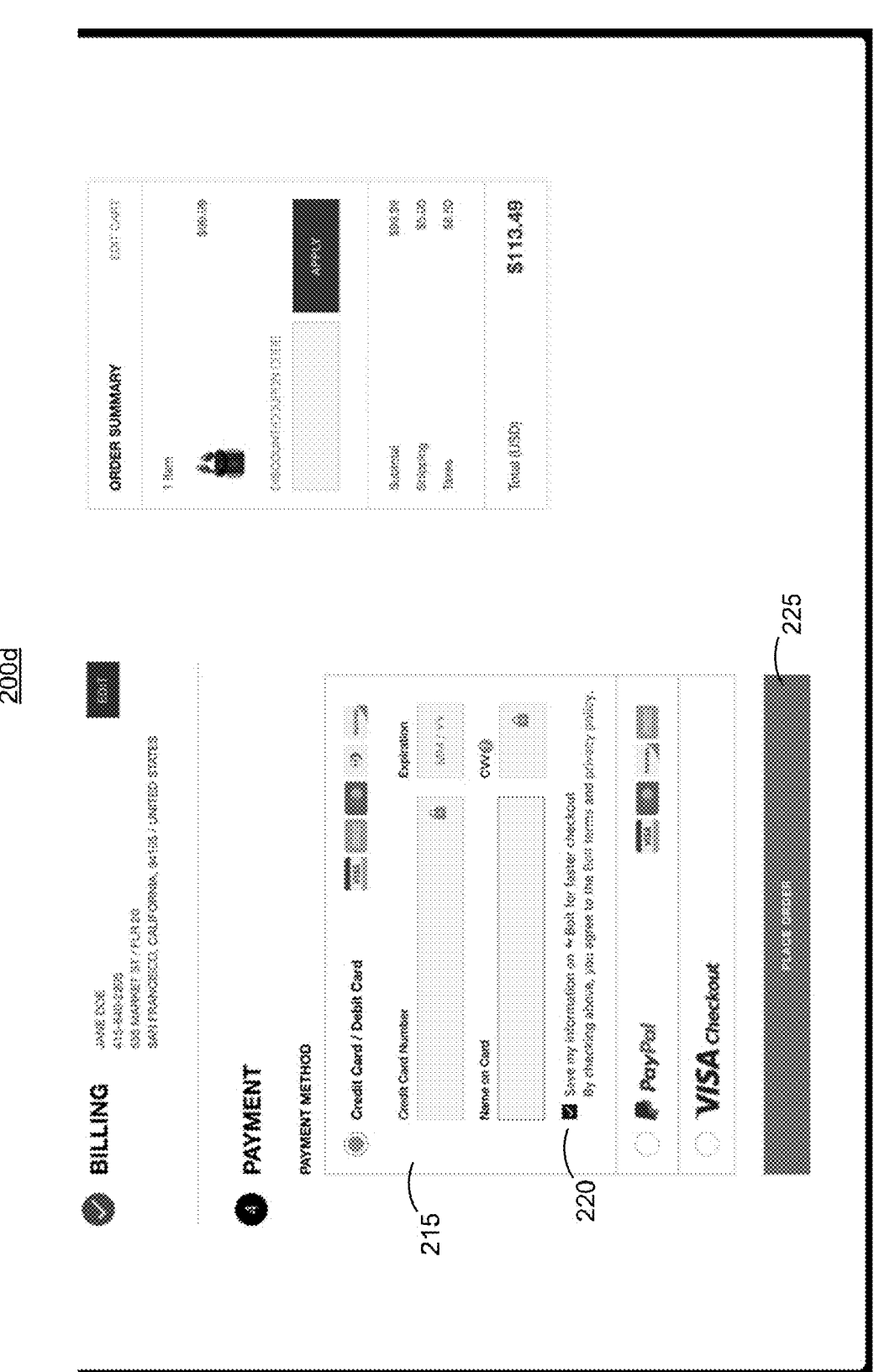

FIGS. 2A-2D illustrate example user interfaces, including user interface that may be shown on a user device that is participating in the method for creating a transaction processing system account for use in embedded checkout described with respect to FIG. 1. FIG. 2A illustrates a user interface 200a of a user who has entered a guest checkout page of a merchant. The user has entered an email address as identifying information into the field 205. The user does not have an account with the merchant, so they select the interactive element 210 to continue as guest. FIG. 2B shows the next user interface 200b seen by the user. Because the user does not have an account with the merchant or with the transaction processing system, the user is prompted to enter all of their relevant order information. This includes shipping address information and billing address information. Upon entering this information the user is transitioned to user interface 200c shown in FIG. 2C. In user interface 200c, the use can now select their preferred payment method and enter the relevant information. The user also sees updated tax and shipping charges based on their provided shipping information and shipping preferences. FIG. 2D shows the field 215 provided by transaction processing system to collect payment information from the user. In particular embodiments, the field 215 can have distinct branding from the rest of the merchant checkout process. The field 215 can also include information explaining how the transaction processing system account works and a checkbox 220 allowing the user to consent the creation of a transaction processing system account on their behalf. Upon click the place order button 225, the customer's order is placed, and the transaction processing system creates an account for the user.

Figure 3:
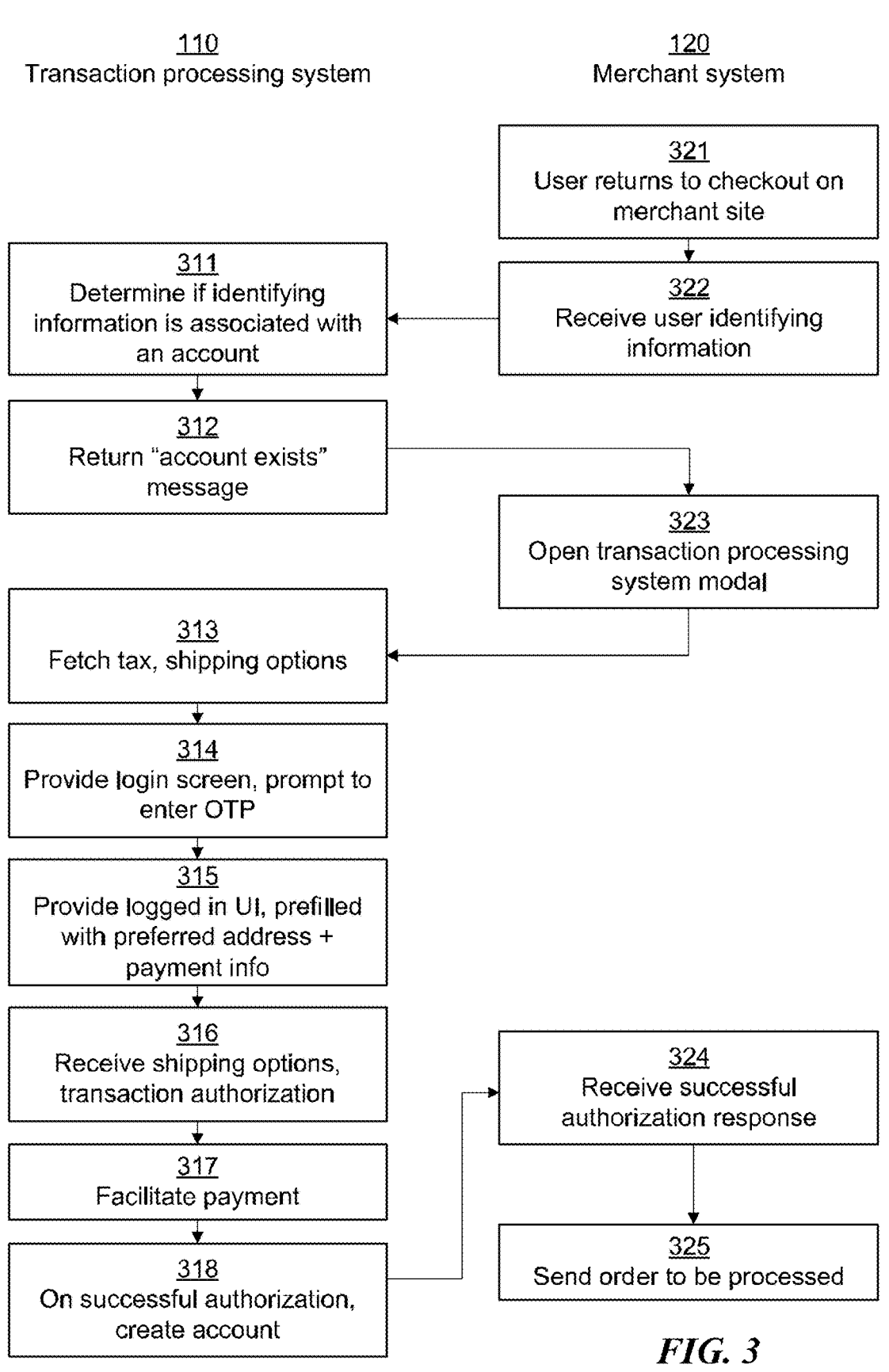
FIG. 3 illustrates example interactions between systems for enabling an embedded one-click checkout.

FIG. 3 illustrates a diagram of example interactions between a transaction processing system (e.g., a computing system or computing server associated with a transaction processing system) and a merchant (e.g., a computing system associated with the merchant) or a merchant vendor. In particular, FIG. 3 illustrates a method 300 for placing an order by accessing information stored in a transaction processing system account through an embedded one-click checkout through the interactions of a transaction processing system 110 and a merchant system 120.

The method begins at step 321, where a user enters a checkout interface on the merchant site. In this example, the user is a repeat customer. The customer may be a returning customer from the merchant, or in some embodiment, may be a returning customer from another merchant who has enabled the embedded one-click checkout flow.

At step 322, the user enters identifying information, such as an email address or phone number, into the guest checkout interface presented at the merchant site. The user may select an interactive interface element to continue the checkout process. The merchant system 120 receives the identifying information and sends a request to the transaction processing system 110. The request may take the form of an call on an application programming interface made available by the transaction processing system 110.

At step 311, the transaction processing system determines if the entered identifying information is associated with an existing transaction processing system account. To determine if an account exists or not, the transaction processing system 110 may query one or more databases maintained by the transaction processing system 110 for the purpose of storing transaction processing system accounts. The transaction processing system 110 can query the database using the provided user identifying information.

At step 312, the transaction processing system 110 has determined that an account associated with the user identifying information exists and returns an "account exists" message to the merchant system 120. At 323, the merchant system 120 receives the "account exists" message and opens a modal provided by the transaction processing system 100. The modal, as explained herein, is used to securely access and display the customer's information to the user via an interface of their user device. Although the user is still sitting on the merchant's site, the user is now interacting with the transaction processing system 110.

At step 313, the transaction processing system calculates additional order charges for the proposed transaction, such as tax and shipping charges based on the available shipping options. The transaction processing system can coordinate these charged now because the transaction processing system 110 knows the likely shipping address from the user's information stored int eh user accounts database. In particular embodiments, the tax an shipping options can be performed by the merchant or by a merchant vendor to ensure that relevant regulations are complied with. This may be necessary if the merchant has not completely passed responsibility for checkout to the transaction processing system.

At step 314, the customer is provided a login screen of the transaction processing system modal. In particular embodiments, the transaction processing system used a one-time-use password, (one time password or OTP). This means that the user does not need to remember a unique password. Instead, the transaction processing system 110 can cause the customer to receive a dynamically generated password to be entered by the customer at the login screen. The transaction processing system 110 can use one of the pieces of identifying information corresponding to a particular communication channel to transmit the OTP. As an example, the OTP can be delivered to the user via a SMS message.

At step 315, the user has entered the OTP and successfully logged in. The user can now see the full modal. The modal can be pre-populated with information retrieved from the user accounts database maintained by the transaction processing system 120 based on the user identifying information. For example, the modal can be prepopulated with user identifying information, user contact information, user addresses for billing and shipping, user shipping preferences, user payment information and preferences, etc.

At step 316, the transaction processing system 110 receives the customer's selection of shipping options and update the modal as necessary to show the full charge for the order corresponding to the proposed transaction. The user then authorizes the order through engaging an interactive element of the modal user interface present on the customer's user device.

At step 317, the transaction processing system 110 proceeds to facilitate payment to the merchant from the customer by securing authorization for the order. In particular embodiments, the transaction processing system 110 can process the payment itself. In particular embodiments, the transaction processing system 110 can use trusted partners to handle payment on its behalf. In particular embodiments, the transaction processing system 110 can use a payment processor specified by the merchant. For example, the merchant system 120 may already have process integrations with a specified payment processor. The transaction processing system can use those existing integrations to streamline payment.

At step 318, the transaction processing system 110 receives an indication that the payment was successfully authorized. This can take the form of a message from the payment processor used during step 115. At 324, the transaction processing system 110 sends a notice of the successful authorization to the merchant system 120. Upon receiving the notice of successful authorization, the merchant system 120 can update its internal records and, at step 325, send the order to be processed, such as by securing inventory for the customer and causing it to be delivered.

Figure 4A:
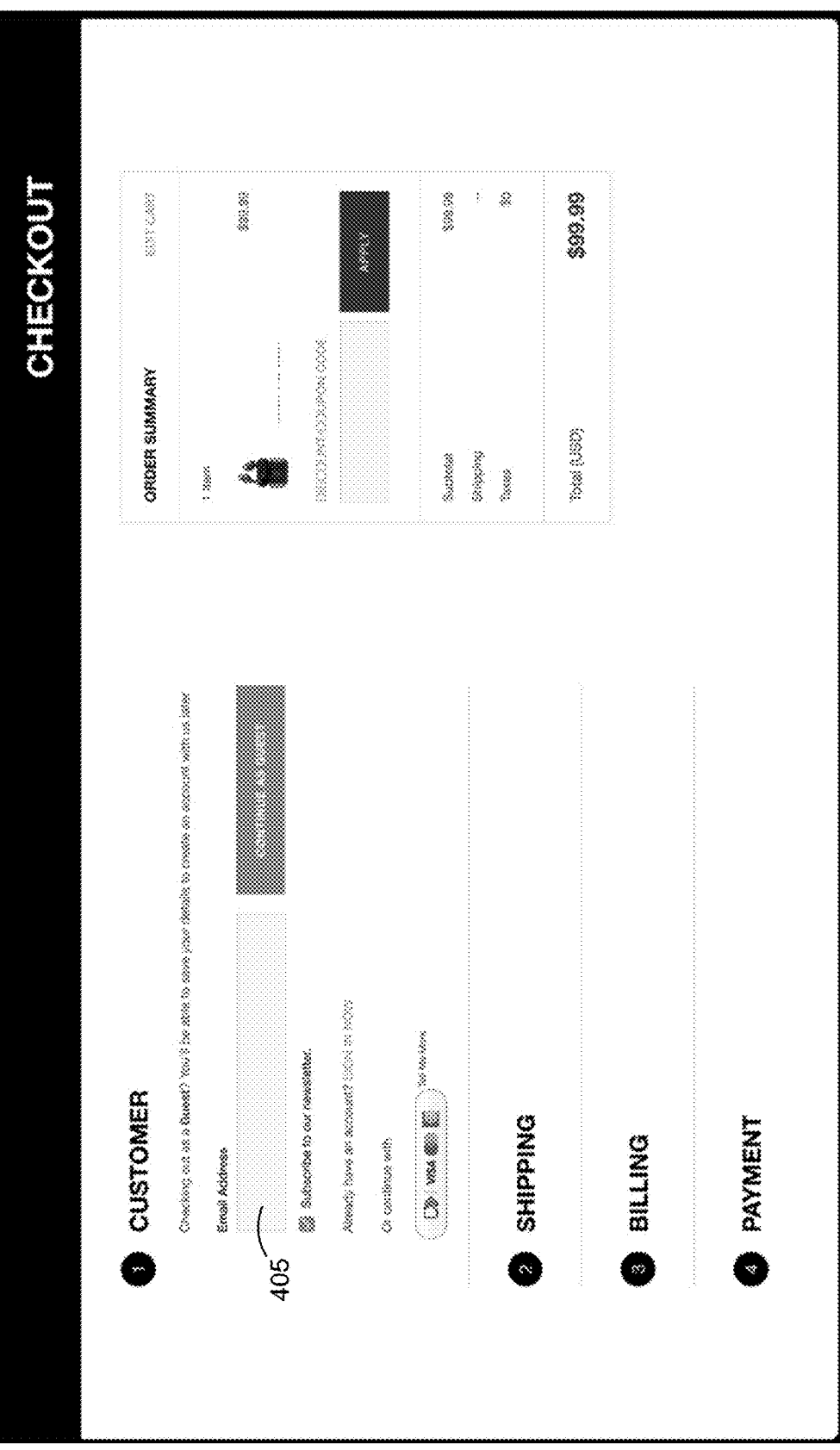
FIGS. 4A-4E illustrate example user interfaces for enabling an embedded one-click checkout.
Figure 4B:
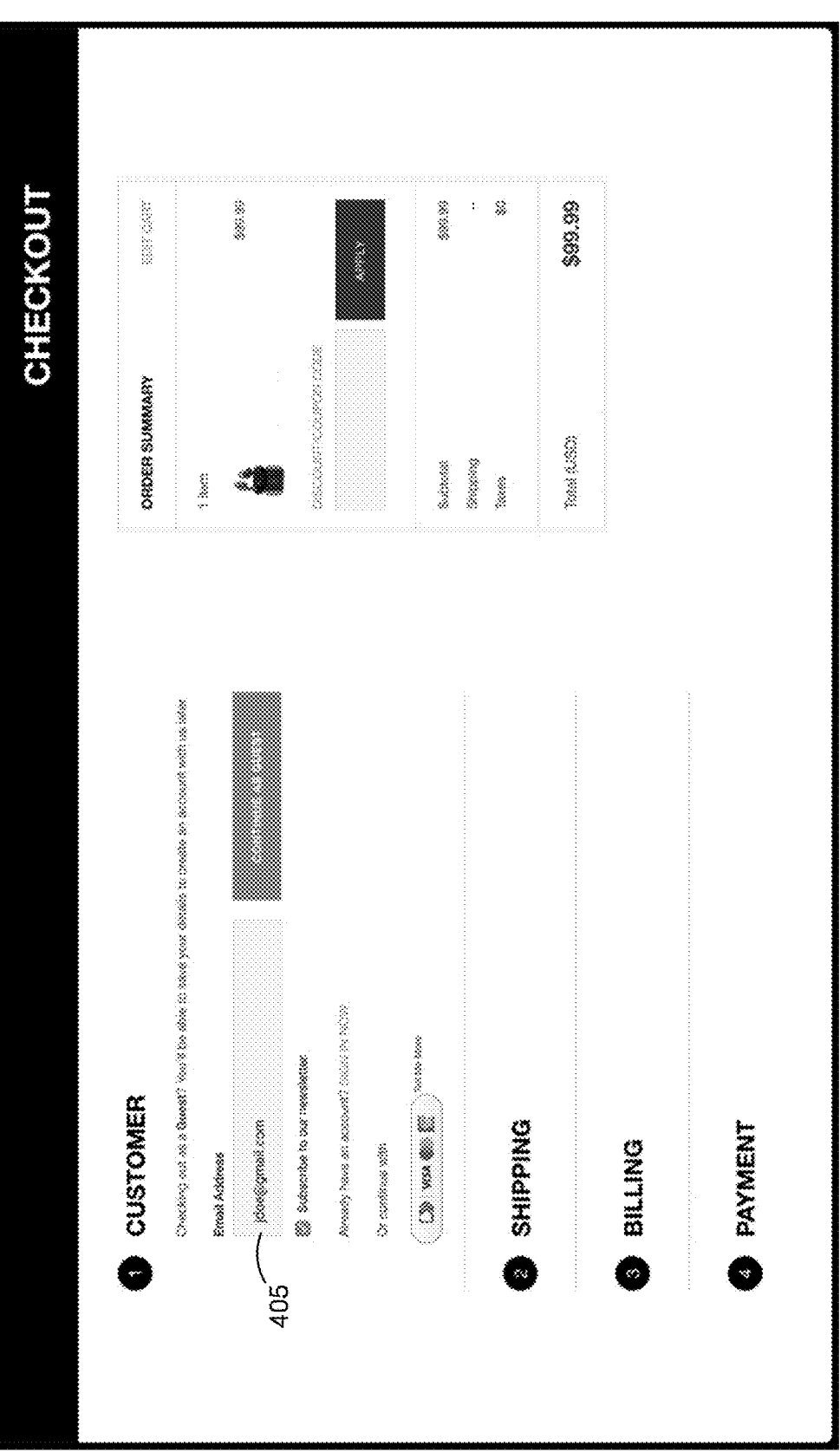
Figure 4C:
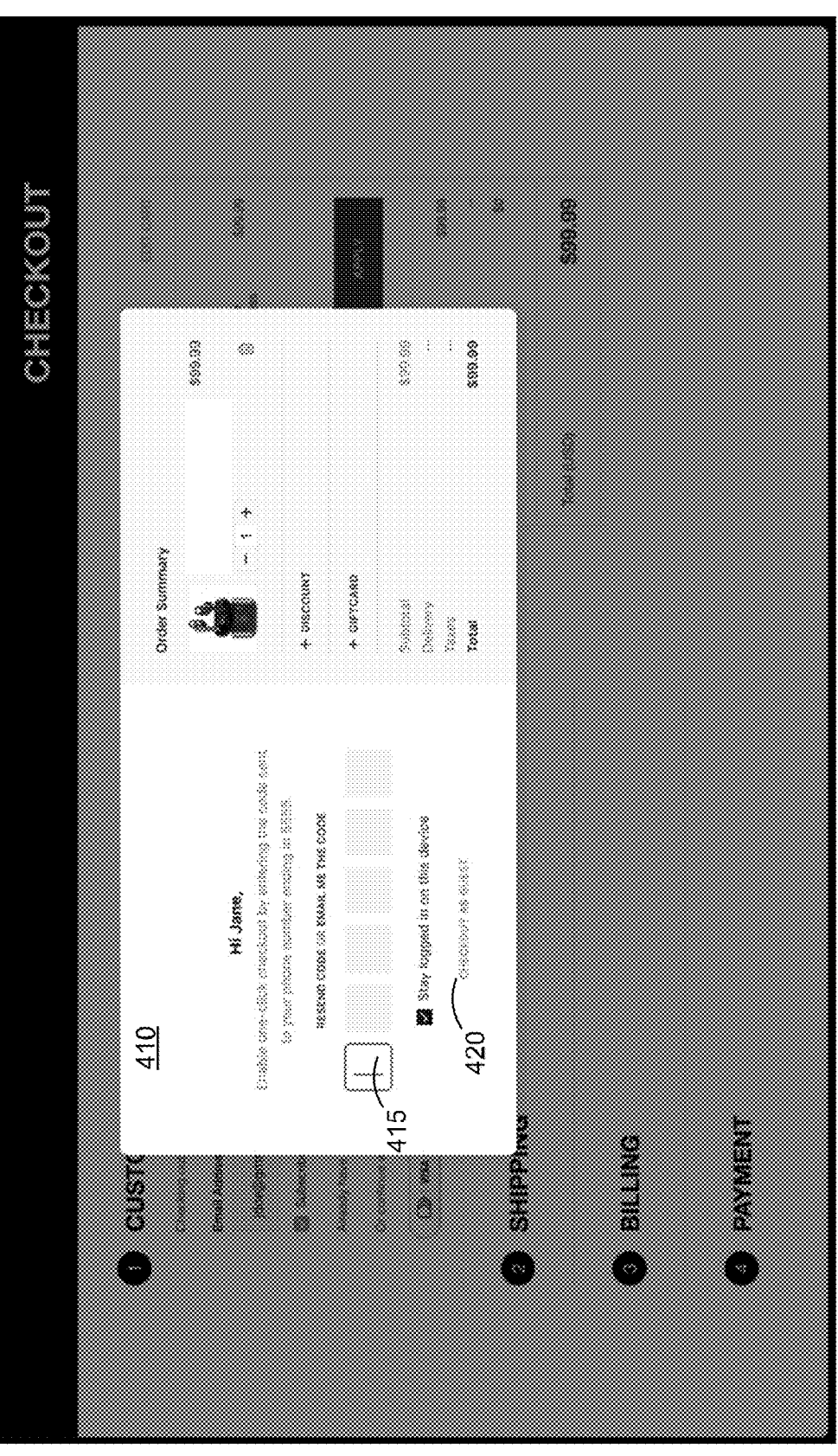
Figure 4D:
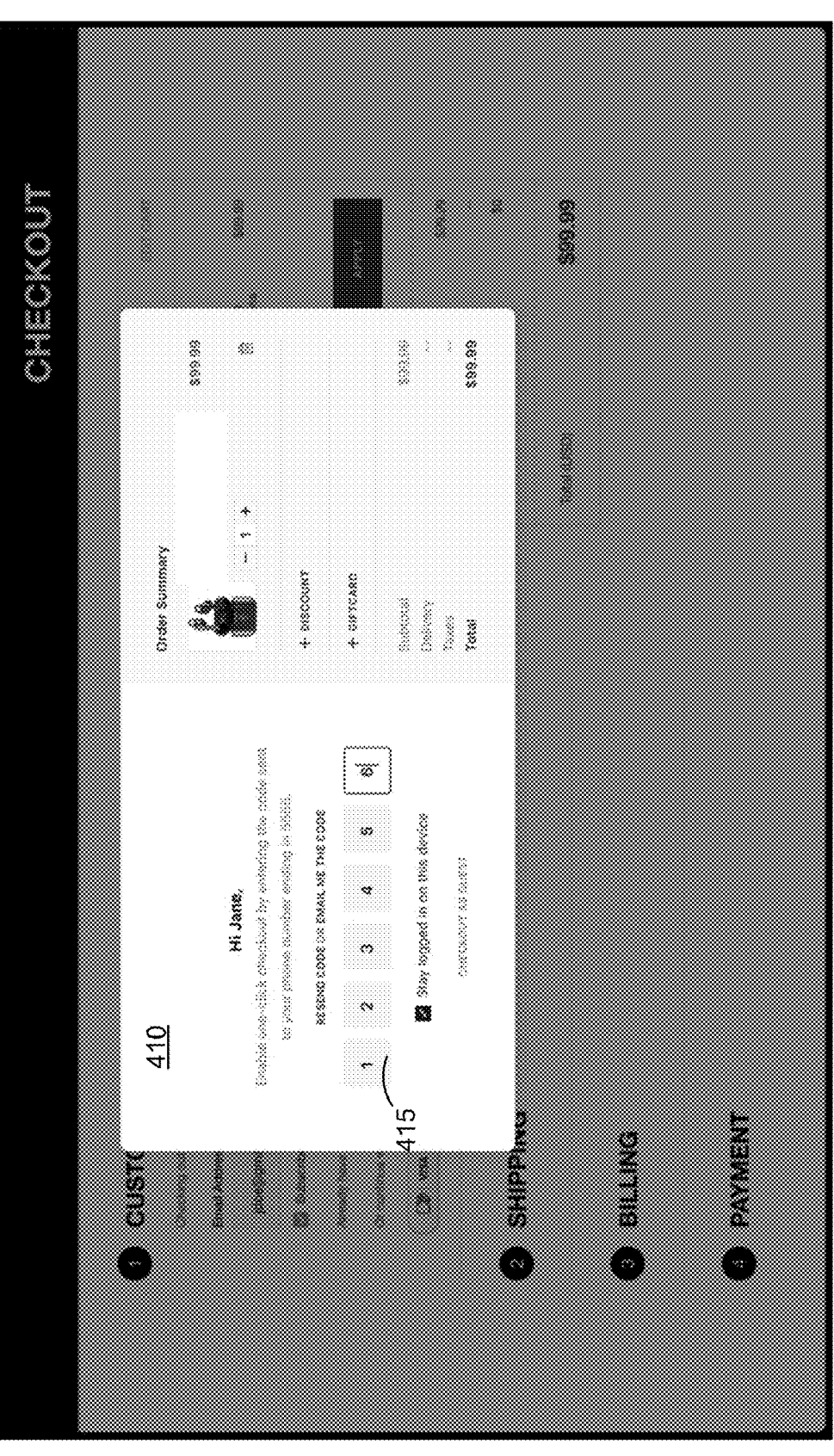
Figure 4E:
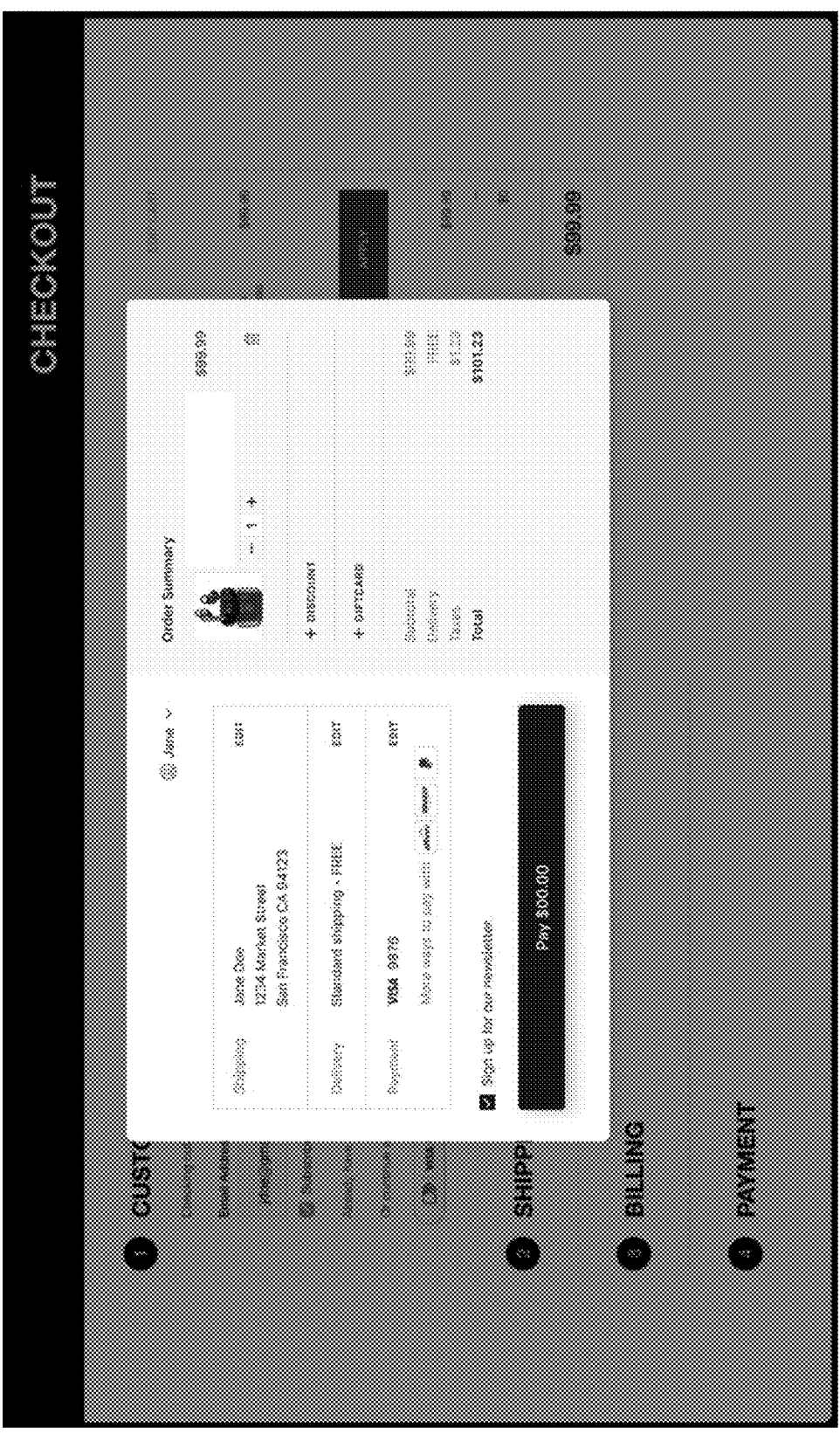

FIGS. 4A-4E illustrate example user interfaces, including user interface that may be shown on a user device that is participating in the method for using the one-click embedded checkout described with respect to FIG. 3. FIG. 4A illustrates a user interface 400*a* of a user who has entered a guest checkout page of a merchant. The user can enter an email address as identifying information into the field 405. FIG. 4B illustrates a user interface 400*b* where the user has entered their email address in the field 405. Once the user enters their email address or once the user interacts with the "Continue as Guest" button. The email address is provided to the transaction processing system, which determines that an account exists that is related to the provided email address. This causes the transaction processing system to prompt the user with an account authorization interface 410. FIG. 4C shows the user interface 400*c* including the authorization interface 410. The user is provided a note regarding instructions on how to finish the login, namely through receiving a message on their phone. The user is prompted to enter the code into the elements 415. If the user wishes, they can revert to the full guest checkout through the interactive element 420. FIG. 4D shows a user interface 400*d*, where the elements 415 of the account authorization interface 410 have been filled with the OTP sent to the customer's phone. After comparing the submitting OTP against an expected OTP to determine a successful correspondence, the user interface advances to user interface 400*e*, shown in FIG. 4E. In user interface 400*e*, the transaction processing system modal is shown, prepopulated with the user shipping information, shipping preferences, and payment information. This saves the user time in re-entering the same data again and speeds up the checkout process to be more efficient for the merchant and transaction processing system.

The user does not have an account with the merchant, so they select the interactive element 210 to continue as guest. FIG. 2B shows the next user interface 200*b* seen by the user. Because the user does not have an account with the merchant or with the transaction processing system, the user is prompted to enter all of their relevant order information. This includes shipping address information and billing address information. Upon entering this information the user is transitioned to user interface 200*c* shown in FIG. 2C. In user interface 200*c*, the use can now select their preferred payment method and enter the relevant information. The user also sees updated tax and shipping charges based on their provided shipping information and shipping preferences. FIG. 2D shows the field 215 provided by transaction processing system to collect payment information from the user. In particular embodiments, the field 215 can have distinct branding from the rest of the merchant checkout process. The field 215 can also include information explaining how the transaction processing system account works and a checkbox 220 allowing the user to consent the creation of a transaction processing system account on their behalf.

Upon click the place order button 225, the customer's order is placed and the transaction processing system creates an account for the user.

Particular embodiments may repeat one or more steps of the example process(es), where appropriate. Although this disclosure describes and illustrates particular steps of the example process(es) as occurring in a particular order, this disclosure contemplates any suitable steps of the example process(es) occurring in any suitable order. Moreover, although this disclosure describes and illustrates an example process, this disclosure contemplates any suitable process including any suitable steps, which may include all, some, or none of the steps of the example process(es), where appropriate. Furthermore, although this disclosure describes and illustrates particular components, devices, or systems carrying out particular steps of the example process(es), this disclosure contemplates any suitable combination of any suitable components, devices, or systems carrying out any suitable steps of the example process(es).

Underlying foundational concepts and terms of art relied upon may relate to one or more of the following:

The Bolt Platform consists of four conceptual parts. The frontend that serves both the main consumer checkout flow as well as internal and external dashboards and administrative tools. The core services that power the checkout flow as well as fraud detection and payments. Bolt is architected as a set of independent services which communicate to each other via HyperText Transfer Protocol Representational State Transfer ("HTTP REST") or AMAZON Web Services Simple Queue Service ("AWS SQS") messages. The Bolt Application Programming Interface ("Bolt API"), which is the primary means by which merchant systems interface with Bolt, exposed to the outside world via HTTPS REST. Plugins, which are deployed to merchant systems and which connect these systems with the Bolt API.

Other foundational concepts and terms of art may relate to one or more of the following:

Processor integrations to automate chargeback handling (syncing, representment)

A regression model to predict chance of winning a representment. From the regression model the system may derive the expected value.

A classification model to recommend action items to the merchant. Example action items including fighting chargebacks or not or what is the most valuable evidence.

Merchant integration to potentially generate evidence automatically. Evidence may include:

AVS results

CVV results

Billing/shipping addresses

Historical orders

Shipment receipt

Tracking details

Third party data on the user

In all example embodiments described herein, appropriate options, features, and system components may be provided to enable collection, storing, transmission, information security measures (e.g., encryption, authentication/authorization mechanisms), anonymization, pseudonymization, isolation, and aggregation of information in compliance with applicable laws, regulations, and rules. In all example embodiments described herein, appropriate options, features, and system components may be provided to enable protection of privacy for a specific individual, including by way of example and not limitation, generating a report regarding what personal information is being or has been collected and how it is being or will be used, enabling deletion or erasure of any personal information collected, and/or enabling control over the purpose for which any personal information collected is used.

The frontend of the Bolt Platform can consist of the following sub-components:

"Connect.js"—renders the Bolt checkout button and bootstrap iframe for checkout

"checkout"—which is the user-facing component for checkout experience

"Merchant"—which is the merchant facing dashboard

"Admin"—which is the internal dashboard used by risk analysts, merchant success, and engineering Example of core services and APIs include:

"API"—which is the set of APIs that power the checkout flow

"adminapi"—which is the set of APIs that power the admin dashboard.

"apihooks"—which sends webhook messages to merchant's shopping platforms

"AsyncJobs"—which is the job framework to handle long-running asynchronous operations

"Notifier"—which sends notifications such as emails and short message service ("SMS") messages "Imageproxy"—which is a lightweight proxy to serve images Backend services may be written in go (with some machine-learning ("ML") logic in python used for risk modeling). Frontend components may be written in React/Typescript. Data may be stored in Postgres, hosted by a relational database service (RDS). Another database used for state management may be Redis.

"Tokenizer" is a completely separate service, available in a serverless way to handle card tokenization. Tokenizer may be maintained completely separate do payment card industry security standards. Tokenizer may be made available in a serverless way, for example, through a service such as AMAZON Lambda. The tokenizer may be implemented in Typescript, powered by a postgres DB. All of the tokenizer infrastructure may be maintained by a separate provider account, with access restricted to a few people.

Below are more details about key services and technology components.

| Service/Component | Purpose/Functionality | Frameworks/Languages |
|---|---|---|
| API | All communication with 3p services, front end code, business logic | Golang |
| Connect.js and iFrame | Connect.js used for rendering checkout button, entry point for merchants IFrame is how we host checkout form, secure communication with API | React Typescript Webpack |
| checkout frontend | Components used to collect user information during checkout | React Redux Webpack Typescript |
| Notifier | Microservice for enqueueing and sending email and SMS notifications to consumers and merchants. | Golang SQS MAILGUN TWILIO |
| Account.js and iFrame | Used for BigCommerce account dashboard-also uses an Iframe to display data | React Redux Webpack Typescript |
| Shopping Dashboard | Features added to above Account.js | React Redux Webpack Typescript |
| Asynchronous jobs | Heavy lifting of job logic to perform tasks like funding, risk review, etc | Golang Redis Machinery |
| Apihooks (i.e Webhooks) | Microservice for enqueueing and sending webhook events to merchant platforms. | Golang SQS |
| Payment jobs | Scheduler for Asyncjobs framework | Golang Machinery Redis |
| Search | service to index transactions for merchant dashboard | Golang Elastic Search |
| Tokenizer | PCI compliant serverless lambda to store credit card information. Used to proxy information to 3rd parties | Node.js AWS Lambda AWS Key Management Service ("KWS") AWS RDS |
| Gatekeeper/A/B experimentation | Experimentation and feature rollout platform | Typescript AWS Simple Storage Service ("S3") AWS CLOUDFRONT |
| Sleet | Provides a standardized wrapper for implementing many payment processor gateways. | Golang |
| Risk pipeline | Modeling training and model serving | Golang Python SAGEMAKER |
| Track.js and iFrame | Used to track customer behavior when they land on merchant's page. Used for risk signals | Typescript React |

-continued

| Service/Component | Purpose/Functionality | Frameworks/Languages |
|---|---|---|
| Ledger | Double write bookkeeping service for funds. Tracks money movements through the system | Golang |
| Chargeback management | Automated system to pull chargeback information from various payment processors and display to merchants in the merchant dashboard chargeback portal | Golang React Typescript |
| Reporting and Reconciliation | Reports pulled from Vantiv and asyncjob with the ledger to ensure fee collection | Golang Asyncjobs AWS S3 |
| Merchant Dashboard | Centralized dashboard for all actions and reporting related to a merchant's management of their Bolt system. | GraphQL React Typescript |
| Admin Dashboard | Centralized dashboard for all internal actions related to managing Bolt merchants. | GraphQL React JavaScript |
| Admin API | API for actions done by Bolt internal employees (onboarding merchants, turning on features) and majority of use is for risk review | Goland GraphQL |

Integration with ecommerce platforms is supported in two ways. First, directly via the API. Second, with plugins deployed to the host instance.

Database: Data is stored in highly available postgres databases backed by AWS RDS. Databases can scale their components within available limits for disk (up to 16 TB), CPU/ram/network (db.x1e.32xlarge which is 64 cpu and 3,904 TB RAM).

Messaging: Both Consumer and Merchant-facing components do messaging through our Notifier Service.

Data Access: Services communicate via REST. GraphQL is used pervasively for all non-external endpoints.

Data Warehouse: A cloud data warehousing service may service as the main data warehouse that stores the refined data. AMAZON ELASTIC MAPREDUCE may be used for extract, transform, load ("ETL") workflows and general analysis of the raw data. AWS Step functions, triggered by a cloud watch event, and AWS Lambda may be used to run the ETL workflows. Results may be loaded into the data warehouse. Code such as ETL scripts may be separately managed. Data consumers (e.g. analysts who look at checkout events) use may use plugins to run queries.

Hosting model: The systems may run on highly available containerized backend services backed, for example, by DOCKER and KUBERNETES on AWS. The backend services may be scaled up/down with zero downtime. Infrastructure for serving the frontend code is highly available and backed by AWS. Frontend serving automatically scales with traffic load.

Logging: Frontend (Bolt checkout modal) logs are sent to an error monitoring and reporting tool. All backend applications (e.g., api, paymentjobs, asyncjobs, notifier, etc.) and infrastructure logs (e.g., kubernetes, AWS) are sent to a cloud monitoring platform. Logs may be archived for long-term storage.

Monitoring: High and low level monitors exist to notify engineers of issues. Monitors are replicated to non-production environments to ensure issues can be caught before they make it to production. Monitors are managed in code to ensure consistency and to track changes. Overall application service-level agreements (SLAs) are measured, and lower level monitoring of metrics and logs may be performed using a cloud monitoring platform.

Figure 5:
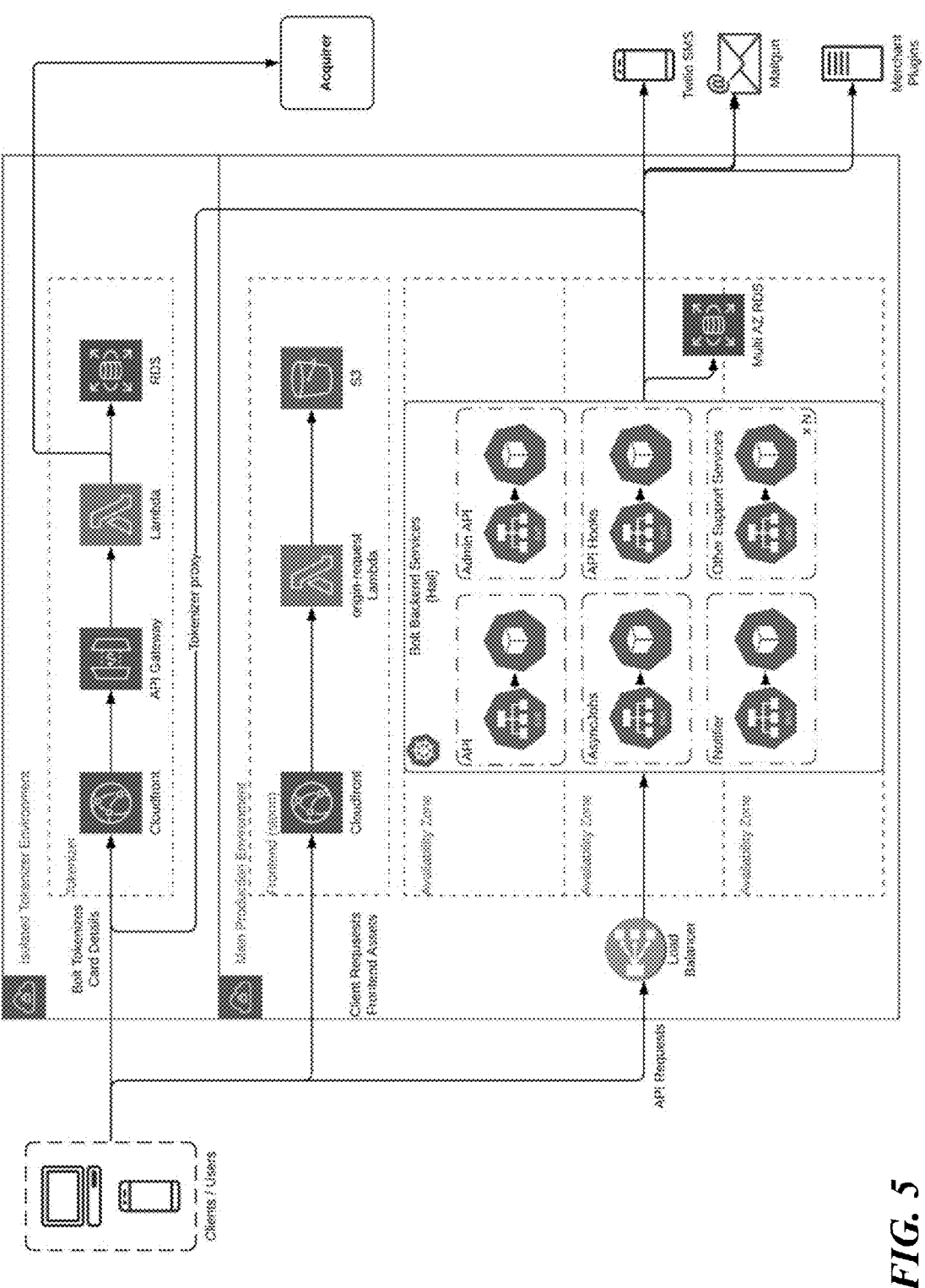
FIG. 5 illustrates physical architecture of a transaction processing system platform.

FIG. 5 highlights the physical architecture of the platform.

Figure 6:
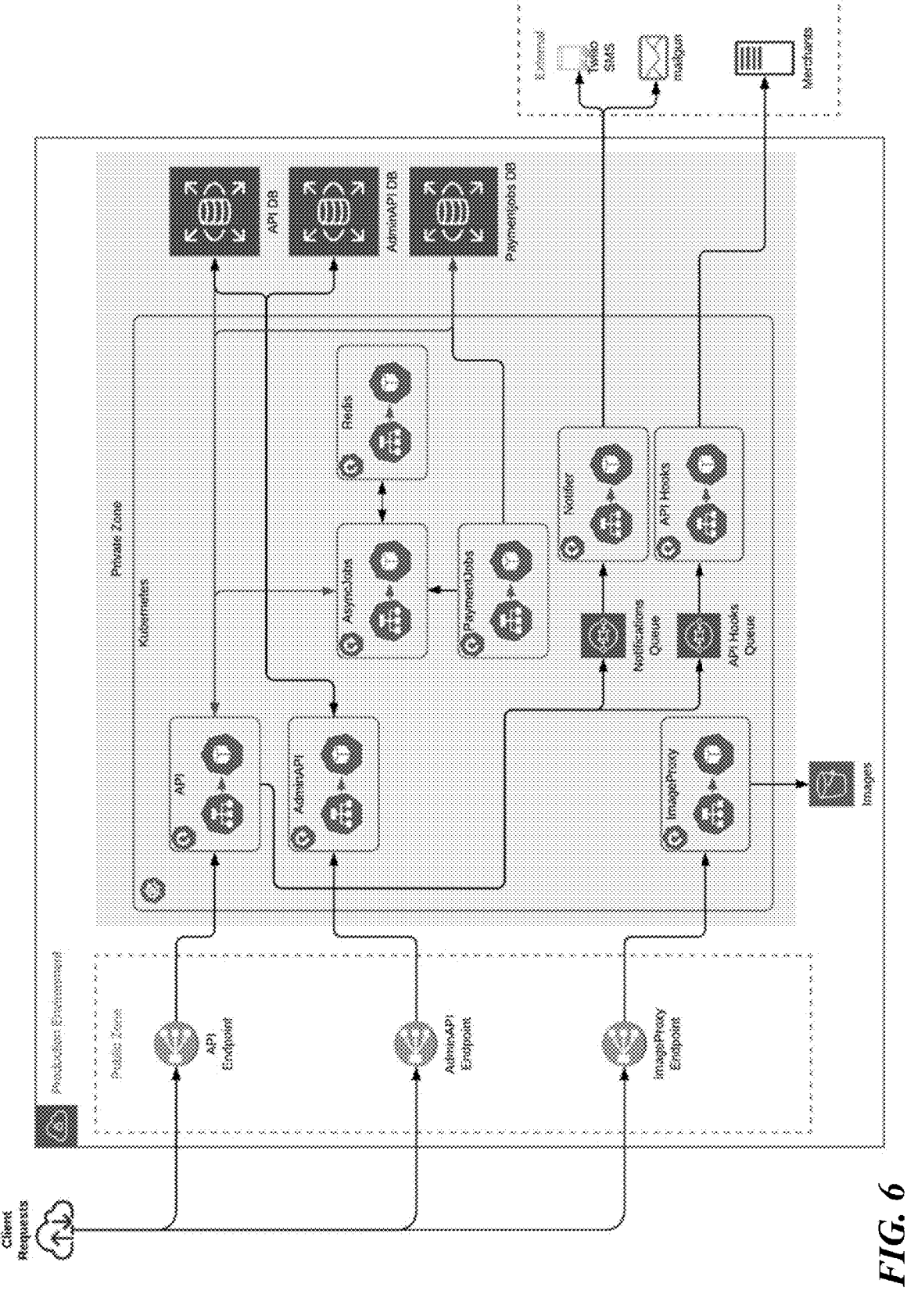
FIG. 6 illustrates an alternate visualization of the platform.

FIG. 6 shows an alternate visualization of the platform, focusing on backend services.

Figure 7:
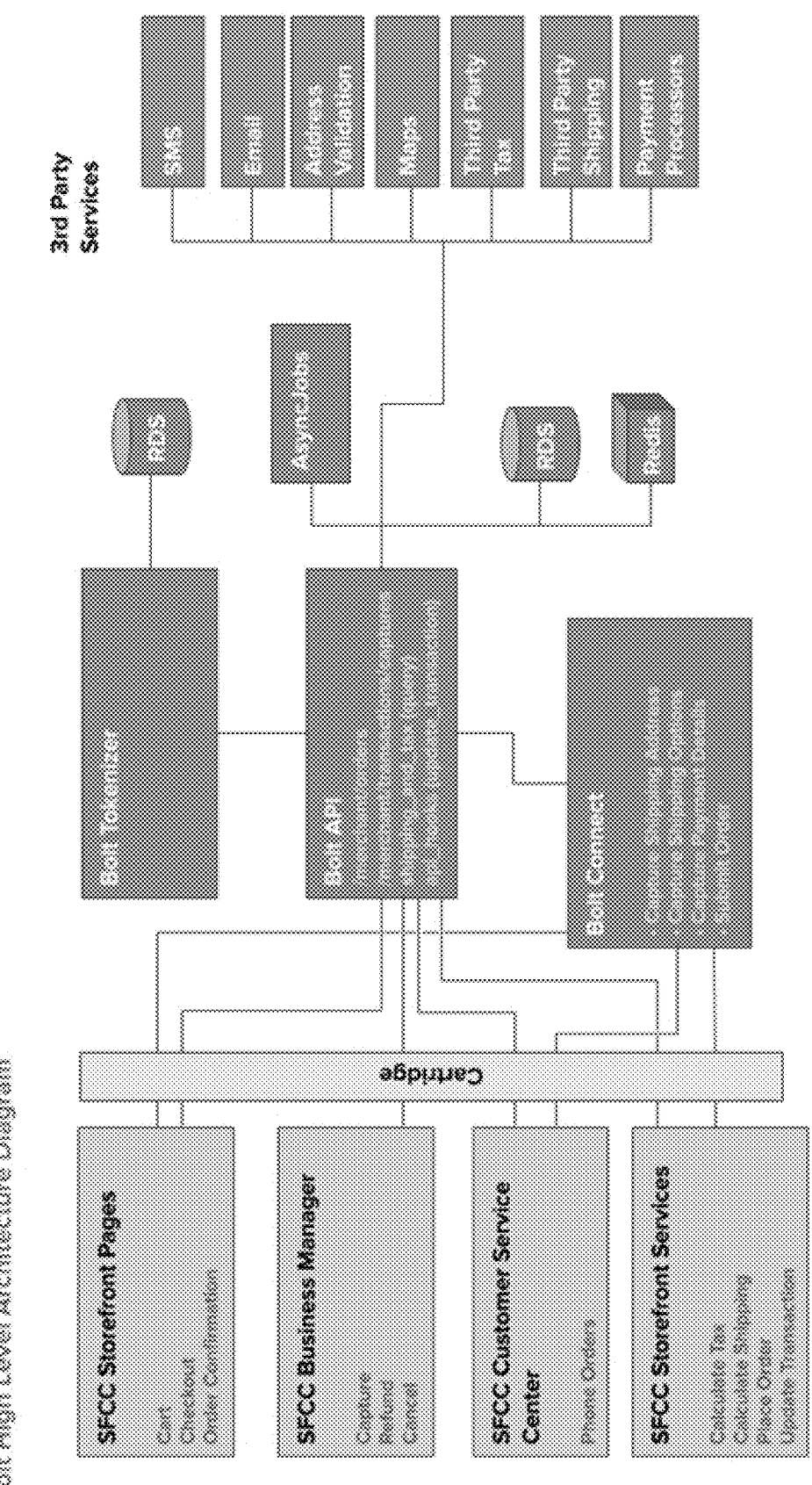
FIG. 7 illustrates transaction processing system platform connections with third party ecommerce platforms.

FIG. 7 is helpful in understanding how the platform connects with a third party ecommerce platform.

Figure 8:
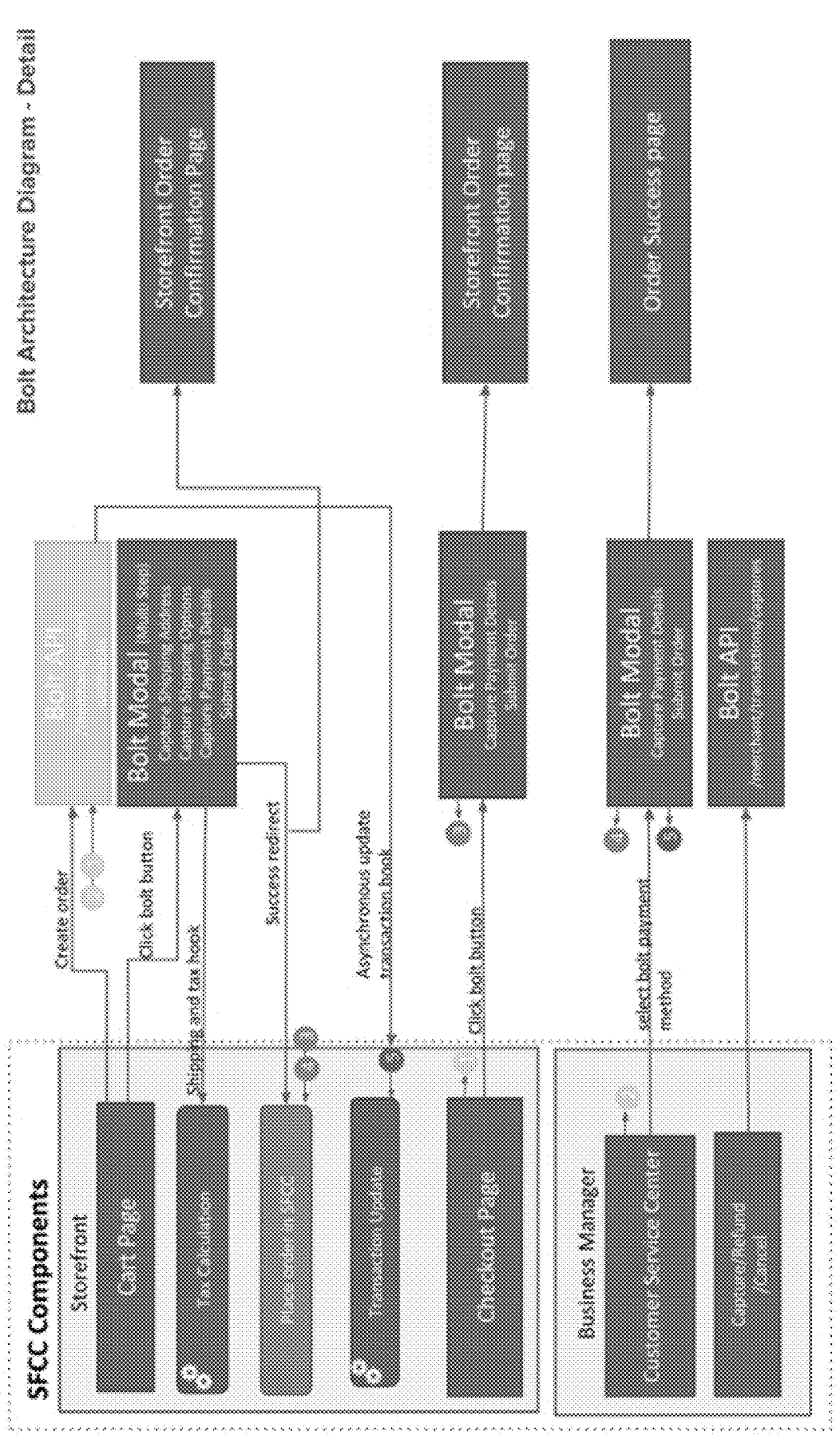
FIG. 8 illustrates information flows between the transaction processing system platform and a third party platform.

FIG. 8 dives a layer deeper and illustrates the information flows between the platform and a third party platform.

Figure 9:
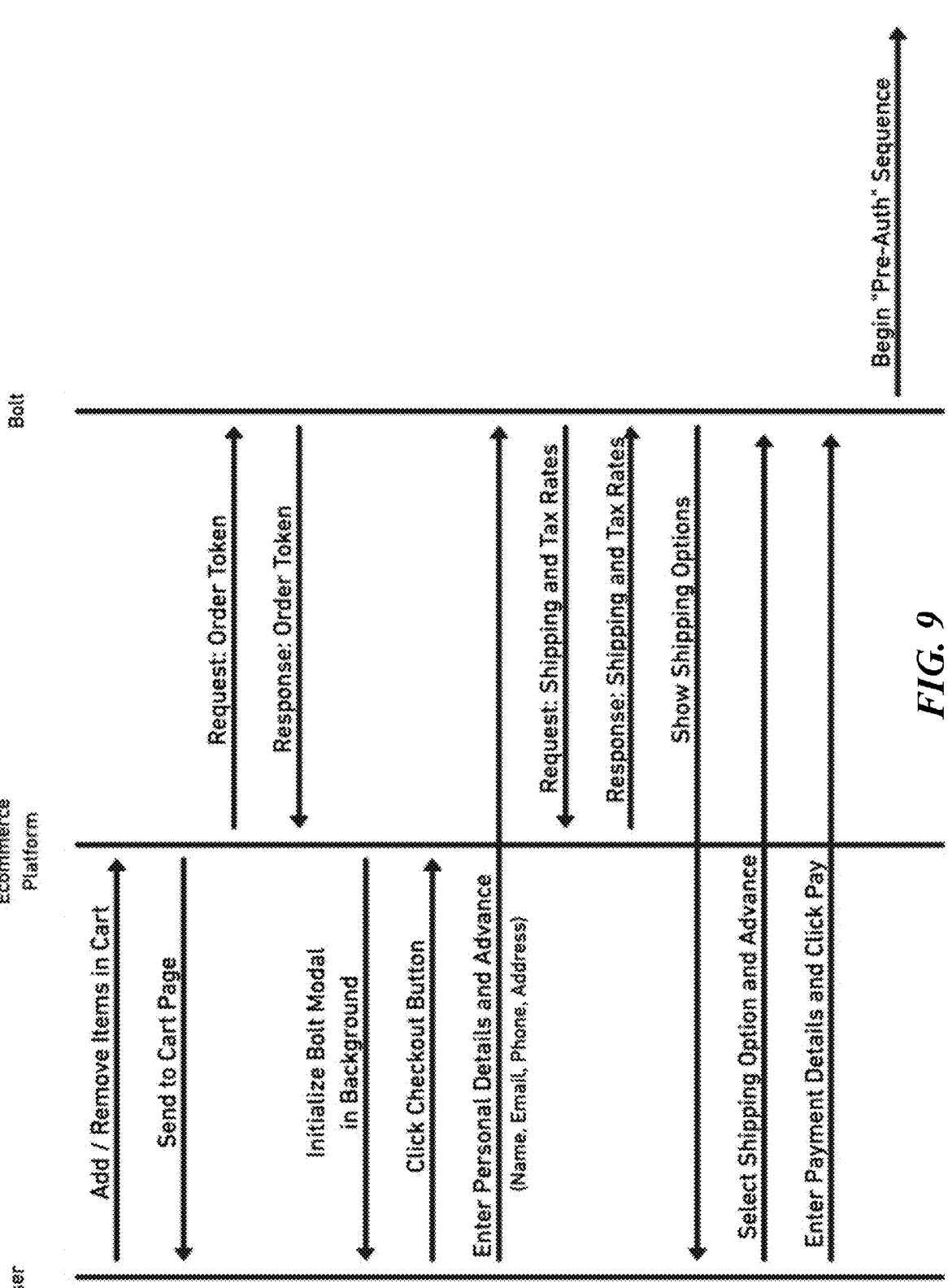
FIG. 9 illustrates the lifecycle of a purchase order.

FIG. 9 illustrates the lifecycle of a purchase order.

Figure 10:
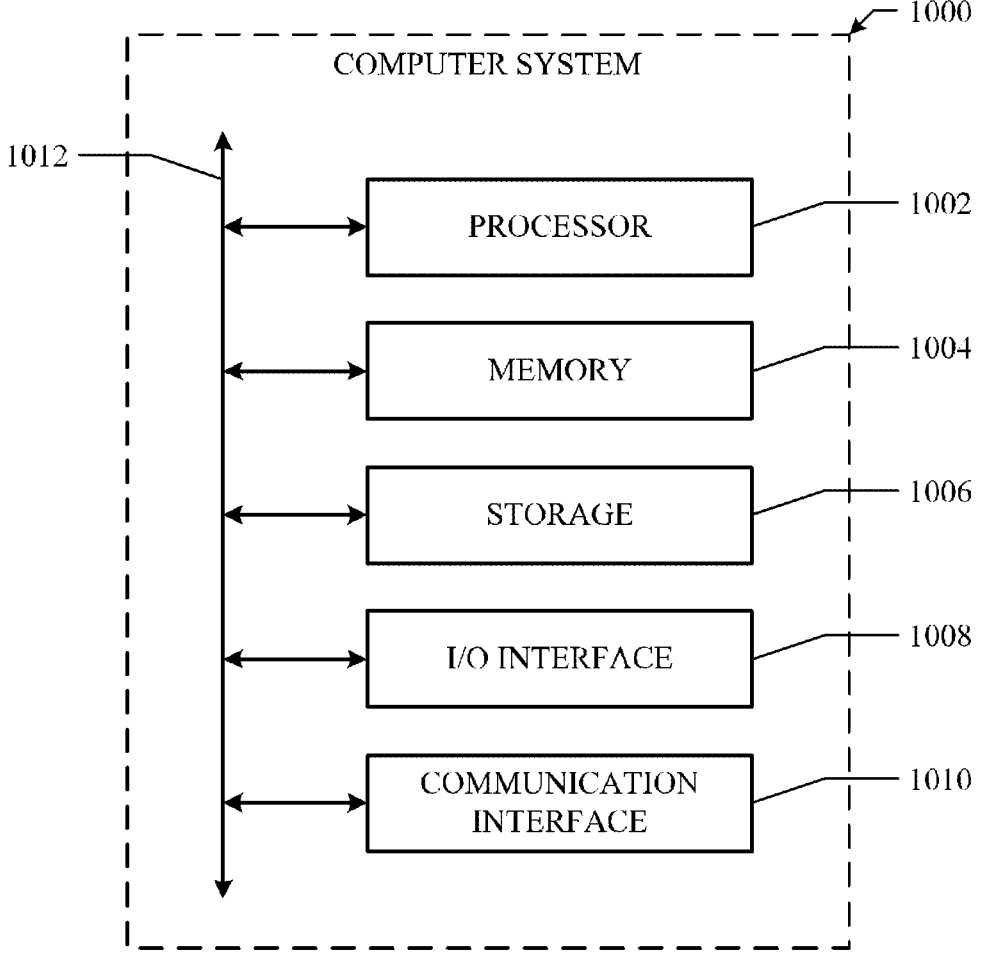
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, any reference herein to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a processing system:

receiving, from a provider system, information associated with a first processing request for a first interaction, wherein the information associated with the first processing request comprises a user identifying information associated with a user;

sending, to the provider system, instructions for generating customized embedded fields within a graphical user interface displayed on a computing device associated with the user, wherein:

the customized embedded fields within the graphical user interface are configured to receive as input data associated with a digital instrument; and a subset of the customized embedded fields within the graphical user interface is configured to analyze the data associated with the digital instrument to determine whether the data associated with the digital instrument is accurate and valid;

receiving, from the provider system, the data associated with the digital instrument;

receiving, from the provider system, a confirmation for the first interaction and an indication that the user has provided authorization to create a user profile with the processing system;

facilitating an authorization for the first interaction; and automatically creating, in response to receiving the indication that the user has provided authorization to create the user profile with the processing system, the user profile in a database and associating the user profile with the information associated with the first processing request, the data associated with the digital instrument, and the user identifying information associated with the user.

2. The method of claim 1, wherein input in the customized embedded fields within the graphical user interface is configured to be transferred from the provider system to the processing system via a secure application programming interface after the subset of the customized embedded fields within the graphical user interface determines that the data associated with the digital instrument is accurate and valid.

3. The method of claim 1, wherein the subset of the customized embedded fields within the graphical user interface is configured with security features for protecting the data associated with the digital instrument.

4. The method of claim 1, wherein the digital instrument is a credit card, and wherein the data associated with the digital instrument comprises a credit card number.

5. The method of claim 1, wherein the information associated with the first processing request further comprises a price associated with the first interaction, a user name, a shipping address, and an identification of a shipping method selected by the user.

6. The method of claim 1, further comprising:

sending, to the provider system, a notification of a successful authorization for the first interaction.

7. The method of claim 1, wherein the graphical user interface displays a checkbox for authorizing a creation of the user profile with the processing system.

8. The method of claim 1, wherein the graphical user interface displays an additional input field for an additional user identifying information associated with the user, further comprising receiving the additional user identifying information.

9. The method of claim 8, further comprising, subsequent to creating the user profile in the database:

receiving, from a second provider system, information associated with a second processing request for a second interaction, wherein the information associated with the second processing request comprises a second user identifying information;

determining that the second user identifying information matches the additional user identifying information received in association with the first interaction;

retrieving, from the database, the information associated with the first processing request and the data associated with the digital instrument received in association with the first interaction; and facilitating an authorization for the second interaction using the information associated with the first processing request and the data associated with the digital instrument received in association with the first interaction.

10. The method of claim 9, further comprising, prior to facilitating the authorization for the second interaction:

causing a second graphical user interface to be displayed on the computing device associated with the user;

sending a first one-time password via a communication channel associated with the second user identifying information;

receiving a second one-time password via the second graphical user interface; and determining whether the second one-time password matches the first one-time password.

11. The method of claim 9, wherein the user profile is associated with a preferred digital instrument, further comprising, prior to facilitating the authorization for the second interaction:

causing the preferred digital instrument to be presented in a checkout interface on the computing device associated with the user; and receiving a confirmation for the second interaction via the checkout interface, wherein the confirmation comprises a selection of a digital instrument from the user.

12. The method of claim 9, wherein the user profile is associated with a preferred shipping address and a preferred shipping method, further comprising, prior to facilitating the authorization for the second interaction:

causing the preferred shipping address and the preferred shipping method to be presented in a checkout interface on the computing device associated with the user; and receiving a confirmation for the second interaction via the checkout interface, wherein the confirmation comprises a shipping address and a shipping method selected by the user.

13. One or more computer-readable non-transitory storage media embodying software that is operable when executed, by a processing system, to:

receive, from a provider system, information associated with a first processing request for a first interaction, wherein the information associated with the first processing request comprises a user identifying information associated with a user;

send, to the provider system, instructions for generating customized embedded fields within a graphical user interface displayed on a computing device associated with the user, wherein:

the customized embedded fields within the graphical user interface are configured to receive as input data associated with a digital instrument; and a subset of the customized embedded fields within the graphical user interface is configured to analyze the data associated with the digital instrument to determine whether the data associated with the digital instrument is accurate and valid;

receive, from the provider system, the data associated with the digital instrument;

receive, from the provider system, a confirmation for the first interaction and an indication that the user has provided authorization to create a user profile with the processing system;

facilitate an authorization for the first interaction; and automatically create, in response to receiving the indication that the user has provided authorization to create the user profile with the processing system, the user profile in a database and associate the user profile with the information associated with the first processing request, the data associated with the digital instrument, and the user identifying information associated with the user.

14. The media of claim 13, wherein input in the customized embedded fields within the graphical user interface is configured to be transferred from the provider system to the processing system via a secure application programming interface after the subset of the customized embedded fields within the graphical user interface determines that the data associated with the digital instrument is accurate and valid.

15. The media of claim 13, wherein the digital instrument is a credit card, and wherein the data associated with the digital instrument comprises a credit card number.

16. The media of claim 13, wherein the graphical user interface displays an additional input field for an additional user identifying information associated with the user, further comprising receiving the additional user identifying information.

17. The media of claim 16, wherein the software is further operable when executed to, subsequent to creating the user profile in the database:

receive, from a second provider system, information associated with a second processing request for a second interaction, wherein the information associated with the second processing request comprises a second user identifying information;

determine that the second user identifying information matches the additional user identifying information received in association with the first interaction;

retrieve, from the database, the information associated with the first processing request and the data associated with the digital instrument received in association with the first interaction; and facilitate an authorization for the second interaction using the information associated with the first processing request and the data associated with the digital instrument received in association with the first interaction.

18. The media of claim 17, wherein the software is further operable when executed to, prior to facilitating the authorization for the second interaction:

cause a second graphical user interface to be displayed on the computing device associated with the user;

send a first one-time password via a communication channel associated with the second user identifying information;

receive a second one-time password via the second graphical user interface; and determine whether the second one-time password matches the first one-time password.

19. The media of claim 17, wherein the user profile is associated with a preferred digital instrument, wherein the software is further operable when executed to, prior to facilitating the authorization for the second interaction:

cause the preferred digital instrument to be presented in a checkout interface on the computing device associated with the user; and receive a confirmation for the second interaction via the checkout interface, wherein the confirmation comprises a selection of a digital instrument from the user.

20. A processing system comprising:

one or more processors; and one or more computer-readable non-transitory storage media coupled to one or more of the processors and comprising instructions operable when executed by one or more of the processors to cause the processing system to:

receive, from a provider system, information associated with a first processing request for a first interaction, wherein the information associated with the first processing request comprises a user identifying information associated with a user;

send, to the provider system, instructions for generating customized embedded fields within a graphical user interface displayed on a computing device associated with the user, wherein:

the customized embedded fields within the graphical user interface are configured to receive as input data associated with a digital instrument; and a subset of the customized embedded fields within the graphical user interface is configured to analyze the data associated with the digital instrument to determine whether the data associated with the digital instrument is accurate and valid;

receive, from the provider system, the data associated with the digital instrument;

receive, from the provider system, a confirmation for the first interaction and an indication that the user has provided authorization to create a user profile with the processing system;

facilitate an authorization for the first interaction; and automatically create, in response to receiving the indication that the user has provided authorization to create the user profile with the processing system, the user profile in a database and associate the user profile with the information associated with the first processing request, the data associated with the digital instrument, and the user identifying information associated with the user.

* * * * *